US012719716B1

(12) United States Patent
Wei et al.

(10) Patent No.: US 12,719,716 B1
(45) Date of Patent: Aug. 25, 2026

(54) INTERNET PROTOCOL (IP) TUNNEL FOR CLOUD-BASED APPLICATIONS ON STREAMING DEVICES

(71) Applicant: Amazon Technologies, Inc., Seattle, WA (US)

(72) Inventors: QingYun Wei, San Jose, CA (US); Sankaranarayanan Mahadevan, Chennai (IN); Jin Wang, San Jose, CA (US); Avinash Joshi, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 504 days.

(21) Appl. No.: 18/352,812

(22) Filed: Jul. 14, 2023

(51) Int. Cl.
*H04L 12/46* (2006.01)
*H04L 61/5038* (2022.01)
*H04L 69/22* (2022.01)
*H04L 101/686* (2022.01)

(52) U.S. Cl.
CPC ...... *H04L 12/4633* (2013.01); *H04L 12/4641* (2013.01); *H04L 61/5038* (2022.05); *H04L 69/22* (2013.01); *H04L 2101/686* (2022.05)

(58) Field of Classification Search
CPC ............. H04L 12/4633; H04L 12/4641; H04L 61/5038; H04L 69/22; H04L 2101/686
See application file for complete search history.

(56) References Cited

U.S. PATENT DOCUMENTS

2018/0375760 A1* 12/2018 Saavedra .............. H04L 63/166
2022/0312181 A1* 9/2022 Sumien ................. H04W 76/12
2023/0081782 A1* 3/2023 Parla .................. H04L 63/0435 709/238

* cited by examiner

*Primary Examiner* — Angela Widhalm De Rodriguez
(74) *Attorney, Agent, or Firm* — K&L Gates LLP

(57) ABSTRACT

Technologies directed to Internet Protocol (IP) tunnels for cloud-based applications on a streaming device are described. One method receives a request to execute a streaming application hosted by the remote computing device. The method establishes a first IP tunnel with the remote computing device using a first virtual interface. The method establishes a second IP tunnel with a container executing the streaming application using a second virtual interface. The method establishing routing between the second virtual interface and a local network interface. The method communicates data with the streaming application over the second IP tunnel.

20 Claims, 21 Drawing Sheets

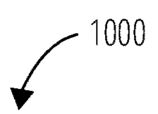
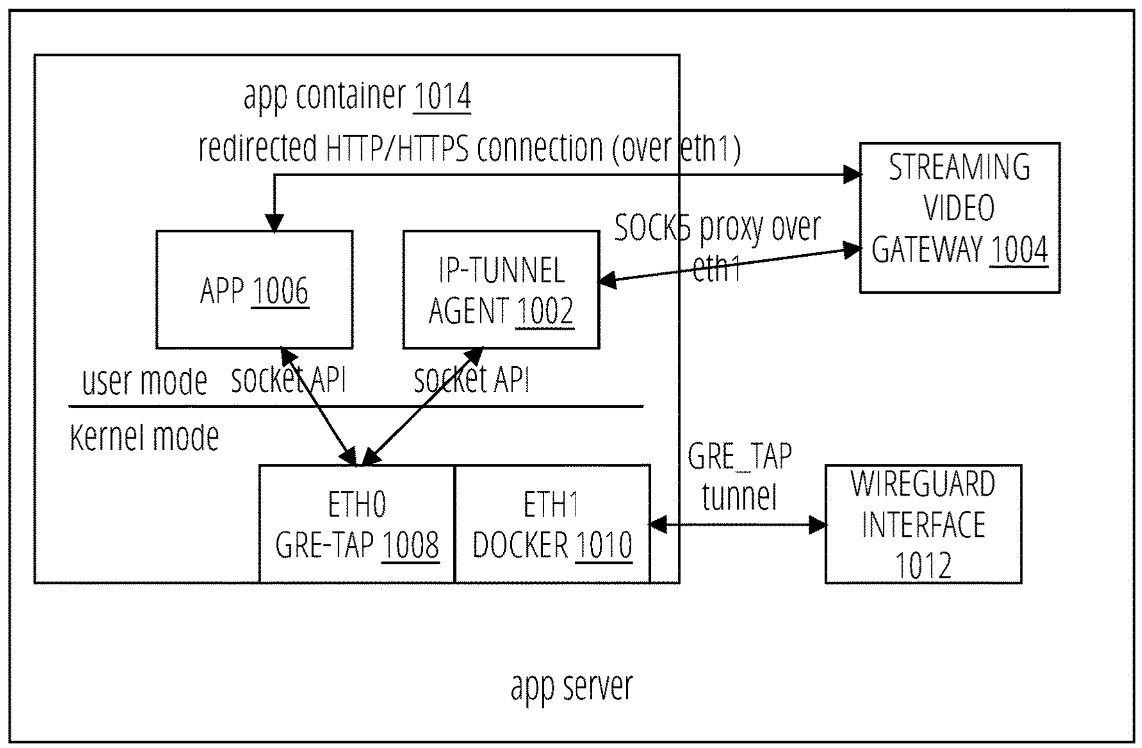
FIG. 10

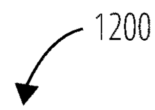

RECEIVE A REQUEST TO EXECUTE A STREAMING APPLICATION, WHEREIN THE STREAMING APPLICATION IS HOSTED ON A REMOTE COMPUTING DEVICE 1202

CREATE A FIRST VIRTUAL INTERFACE, WHEREIN AN IPV6 ADDRESS IS ASSIGNED TO THE FIRST VIRTUAL INTERFACE AND ASSOCIATED WITH A PRIVATE NETWORK WITH A CONTAINER EXECUTING THE STREAMING APPLICATION ON THE REMOTE COMPUTING DEVICE 1204

ESTABLISH A FIRST INTERNET PROTOCOL (IP) TUNNEL WITH THE REMOTE COMPUTING DEVICE, WHEREIN THE FIRST IP TUNNEL IS A LAYER-3 TUNNEL 1206

CREATE A SECOND VIRTUAL INTERFACE 1208

SEND, TO THE REMOTE COMPUTING DEVICE, A DEVICE IDENTIFIER ASSOCIATED WITH THE DEVICE AND AN IPV4 ADDRESS ASSIGNED TO THE STREAMING APPLICATION, WHEREIN THE IPV4 ADDRESS IS ASSOCIATED WITH A LOCAL NETWORK, WHEREIN THE DEVICE IS PART OF THE LOCAL NETWORK 1210

ESTABLISH A SECOND IP TUNNEL WITH THE CONTAINER, WHEREIN THE SECOND IP TUNNEL IS A LAYER-2 ETHERNET-OVER-IP TUNNEL 1212

ESTABLISHING ROUTING BETWEEN THE SECOND VIRTUAL INTERFACE AND A LOCAL NETWORK INTERFACE OF THE DEVICE 1214

COMMUNICATE DATA WITH THE STREAMING APPLICATION OVER THE SECOND IP TUNNEL 1216

FIG. 12

Forwarding policy

| | input key | output socket |
|---|---|---|
| unicast downstream | UDP socket ID / device ID | DTLS socket with same deviec ID |
| unicast upstream | Dest MAC address / deviec ID | UDP socket with the same MAC address and device ID |
| broadcast/multicast | device ID | DTLS and UDP sockets (except input socket) with the same device ID |

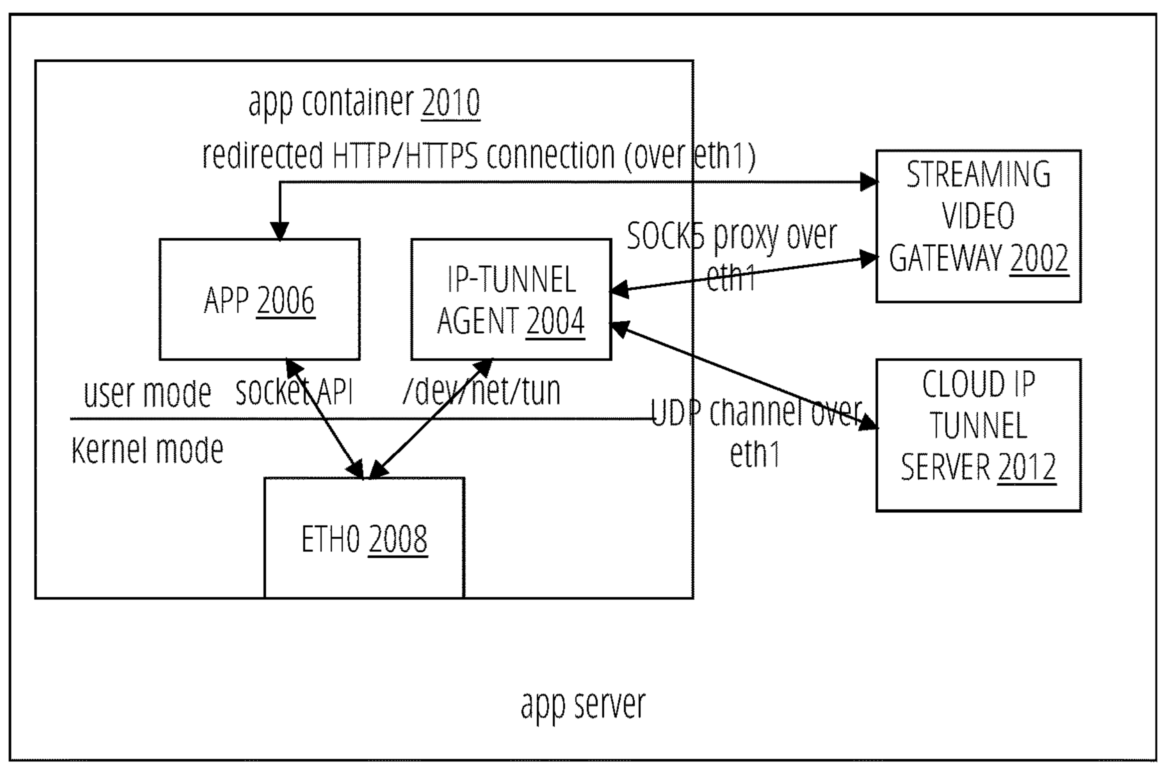
FIG. 20

INTERNET PROTOCOL (IP) TUNNEL FOR CLOUD-BASED APPLICATIONS ON STREAMING DEVICES

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 10 illustrates components of an IP-tunnel agent in an app container of an app server according to at least one embodiment.

FIG. 12 is a flow diagram of a method of establishing two IP tunnels with a remote computing device according to at least one embodiment.

FIG. 20 illustrates components of an IP-tunnel agent 2004 in an app container 2010 of an app server 2000 according to at least one embodiment.

DETAILED DESCRIPTION

Figure 1:
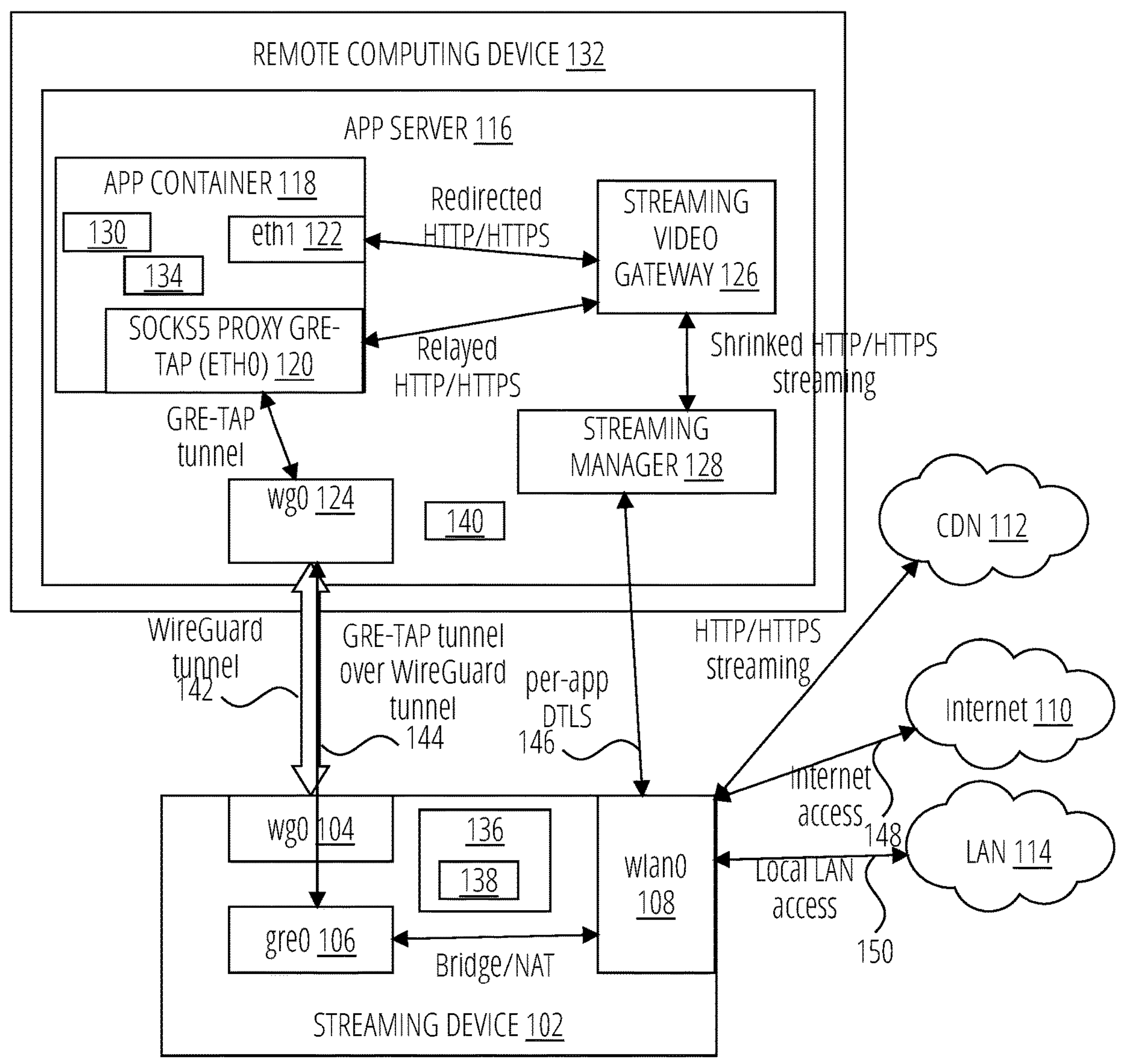
FIG. 1 is a network diagram of an architecture with two Internet Protocol (IP) tunnels for a streaming application hosted by a remote computing device to operate as part of a local network of a streaming device, according to at least one embodiment.

Technologies directed to Internet Protocol (IP) tunnels for cloud-based applications on a streaming device are described. Third-party streaming services, like Netflix and Spotify, need time to develop native applications (also referred to as apps) on different platforms. When a new platform is launched, a lot of these third-party native apps are not available for the launch.

Aspects and embodiments of the present disclosure address the deficiencies above and others by providing a cloud-based app solution for streaming devices, like a smart TV, a smart streaming speaker, a set-top box, a media player device, or the like. Aspects and embodiments of the present disclosure can close the gap between a launch and the native apps being available for a platform by executing a native apps (e.g., native FireOS apps) on a cloud computing system in a docker container using a cloud streaming technology, like the Netzyn cloud streaming technology. The native app on the computing system becomes a cloud-based app. A docker container, also referred to herein as an app container, is a lightweight, standalone, and executable package that encapsulates an application along with all its dependencies, libraries, and configurations required to run consistently across different computing environments. It leverages containerization technology to provide a consistent and isolated runtime environment for applications. The cloud streaming technology captures a user interface surface of the cloud-based app and streams the output to a media player executing on a streaming device for rendering.

For digital rights management (DRM) enabled video streaming services, a conventional cloud streaming technology has a video gateway on the cloud to intercept streaming requests (e.g., HTTP/HTTPS requests) from the app and redirect them to the media player on the streaming device to process. As such, the real video streaming, decoding, and playback happen on the device side using a device's local Internet Protocol (IP) address. Other non-streaming Internet accesses from the app will be relayed to the third-party streaming service's backend by the video gateway using a cloud IP address. The app's non-HTTP/HTTPS traffic for local network access, such as multicast Domain Name System (mDNS), will be dropped since the conventional cloud streaming technology cannot provide the local area network (LAN) access for the cloud-based apps. The cloud-based app uses a cloud IP address pool for Internet access, which could disrupt the following functions of the app: IP reputation and fraud detection, in-app targeted advertisements, login restrictions based on household IP address, device-to-device (D2D) communications over a local home network, or the like, as described in more detail below.

For IP reputation and fraud detection, as the IP addresses used by the cloud app keep changing, it could cause app cloud backend not to trust the app's connection requests, which result in such connections being classified as fraudulent traffic.

For in-app targeted advertisements, the App backend servers use the source IP addresses of HTTP/HTTPS connections to determine the advertisements targeted to a region (e.g., a city). When the cloud public IP address used by the app and the device's local public IP address are in different regions, the targeted advertisements could be wrong that may result in revenue loss for app vendors.

For login restriction based on household IP address, some streaming apps have password-sharing subscriptions that use household IP addresses to determine whether user logins should be allowed. When the app uses the cloud public IP address to log in, such password sharing subscription may not work.

For D2D communications over a local home network, some apps that rely on D2D communication, like mDNS, Universal Plug and Play (UPnP), Digital Living Network Alliance (DLNA), and local file sharing cannot work when running on the cloud. The recent Matter smart home protocol requires IPv6 for command-and-control use cases among Internet of Things (IoT) devices through a local network, which cannot be supported by the existing cloud streaming infrastructures.

Aspects and embodiments of the present disclosure address the deficiencies above and others by providing an enhanced cloud streaming infrastructure that uses IP tunnel mechanisms between the cloud app container and the streaming device in a local network. The IP tunnel mechanisms can use the WireGuard protocol to establish a WireGuard tunnel. The IP tunnel mechanisms can use an Ethernet-over-IP protocol, such as the Generic Routing Encapsulation (GRE) tunneling with a terminal access point (TAP) interface. The TAP interface is a virtual network interface that operates at a data link layer to create a virtual point-to-point link between two network interfaces. When configuring a GRE tunnel, a TAP interface is often used to bridge the physical interface of one device with the GRE tunnel on another device. The TAP interface provides a virtual connection between the two devices, allowing them to communicate over the GRE tunnel as if they were directly connected. GRE is a technique used in networking to encapsulate packets from one network protocol within another protocol, enabling them to traverse a network securely and privately. It is often used in situations where one network must communicate with another network, but they use different network protocols that are not directly compatible. GRE tunnels work by encapsulating packets from one protocol within another protocol. For example, packets from an IPv4 network can be encapsulated within a GRE packet and transmitted over an IPv6 network. The receiving end of the tunnel then decapsulates the packet and forwards it to the appropriate network. This enables different types of networks to communicate with each other without needing to directly support the same protocol. GRE tunnels are commonly used for secure Virtual Private Network (VPN) connections, allowing remote devices to access a private network over an untrusted network, such as the Internet. The IP tunneling mechanism (WireGuard and GRE-TAP based IP tunnel mechanism) between the cloud-based app container and streaming device, the cloud-based app can transparently use the streaming device's local home network's IP address for Internet and local LAN access through the IP tunnels, which could resolve the problems described above.

Aspects and embodiments of the present disclosure can enable a cloud-based app to access the Internet using the streaming device's local home network's IP address without any changes in code of the apps. Aspects and embodiments of the present disclosure can enable a cloud-based app to obtain a streaming device's local address for local D2D communications. Aspects and embodiments of the present disclosure can support local LAN access over multicast and IPv6 through the IP tunnel. Aspects and embodiments of the present disclosure of the IP tunnel mechanism can operate seamlessly with existing cloud streaming technology architectures without overhauling the current cloud streaming protocols and implementations on the cloud, device, and container side. One method receives a request to execute a streaming application hosted by the remote computing device. The method establishes a first IP tunnel with the remote computing device using a first virtual interface and a second IP tunnel with a container executing the streaming application using a second virtual interface. The method establishes routing between the second virtual interface and a local network interface. The method communicates data with the streaming application over the second IP tunnel.

To attach the cloud-based app container to the streaming device's home network, reverse VPN tunneling is required. That means the streaming device needs to run as an IP tunnel server to provide the home network addressing and access to cloud-based app containers running as IP-tunnel clients. Such tunneling has to be layer-2 Ethernet over IP encapsulation since multicast support like mDNS is required over the tunnel. This solution leverages the Linux WireGuard tunnel to first establish the layer-3 IPv6 connectivity between the streaming device and the cloud-based app container. Then over the IPv6 internal network, the cloud-based app container further creates a layer-2 Ethernet over IPv6 GRE-TAP tunnel with the streaming device. After that, the streaming device enables bridging or NAT routing between its physical local Wi-Fi/Ethernet network and the GRE-TAP tunnel interface to provide the local IPv4 addressing and LAN/Internet access for the cloud-based app container. In some embodiments, an IPv6 address associated with the streaming device can be provided to the cloud-based app container for other operations in connection with the LAN/Internet access.

Wireguard/GRE-TAP IP Tunnel Solution

FIG. 1 is a network diagram of an architecture with two IP tunnels for a streaming application 130, hosted by a remote computing device 132, to operate as part of a local network of a streaming device 102, according to at least one embodiment. The streaming device 102 can include a memory device that stores instructions and a processing device operatively coupled to the memory device. The processing device can execute instructions to perform various operations described herein. The remote computing device 132 can be part of a cloud computing system, including multiple memory devices and processing devices, to perform various operations described herein.

In order to establish the two IP tunnels between an app container 118 on the remote computing device 132, the architecture includes a cloud IP tunnel server 140, an IP-tunnel agent 134 inside the app container 118, and an IP-tunnel agent 138 inside a media player 136 on the streaming device 102. The IP-tunnel agent 138 can establish a first IP tunnel 142 (i.e., IP tunnel connection) with a streaming manager 128 (also referred to herein as cloud streaming app server) in an app server 116 (e.g., AWS EC2 instance). A new first virtual interface 104 "wg0" is created on streaming device 102 using a VPN protocol, such as the WireGuard protocol, using the Linux WireGuard kernel module. The first virtual interface 104 "wg0" only communicates with the app container 118 for establishing a second IP tunnel 144 (e.g., the inner GRE-TAP tunnel). The first virtual interface 104 (e.g., the WireGuard interface) is provisioned with an IPv6 address to join an internal private network with app container 118, which means app container 118 can communicate with the streaming device 102 using the internal IPv6 addresses through the first IP tunnel (e.g., the WireGuard IP tunnel). IPv6 has enough address space to support millions of devices to join a private network, making it a better choice than using IPv4 addresses to form the internal private network. In particular, over the first IP tunnel 142 (labeled "WireGuard tunnel"), the streaming device 102 accepts a request from the app container 118 to establish the second IP tunnel 144 (labeled "GRE-TAP tunnel over WireGuard tunnel) with a second virtual interface 106 (e.g., gre0). In at least one embodiment, the IP-tunnel agent 138 creates an internal virtual IPv4 address for app container 118 if network address translation (NAT) is used. In at least one embodiment, the IP-tunnel agent 138 obtains a new local IPv4 address from a Dynamic Host Configuration Protocol (DHCP) server on the local network. The IPv4 address can be assigned to the app container 118 through an existing control channel 146, such as a DTLS control channel. DTLS is a security protocol that provides encrypted communication between two endpoints over an unreliable network, such as the Internet. It is a variation of the Transport Layer Security (TLS) protocol but is designed for use with datagram transport protocols such as User Datagram Protocol (UDP) rather than Transmission Control Protocol (TCP). DTLS uses UDP and TLS uses TCP. Over the second IP tunnel 144 (e.g., the inner GRE-TAP tunnel), the app container 118 can obtain Internet access 148 and local LAN access 150 using the streaming device's local home network addressing. Once the second IP tunnel 144 is established, the app container 118 can discover devices (e.g., speakers) that are part of the LAN 114 or a wireless personal area network (WPAN) of the streaming device 102. For example, a SONOS local discovery can be performed to discover speakers in the vicinity of the streaming device 102. In at least one embodiment, all packet forwarding among the first virtual interface 104 (wg0), second virtual interface 106 (gr0), and a local network interface 108 (e.g., eth0 or wlan0 interfaces) for tunneling, encryption/decryption, bridging, and NAT are conducted in a kernel mode, which can improve performance and reduce latency. In other embodiments, an IPv6 address associated with the streaming device 102 can be provided to the app container 118.

In at least one embodiment, on the cloud side, the cloud IP tunnel server 140 does not implement a data plane in user mode since all packets between the app containers to streaming devices are forwarded through kernel mode IP routing. In at least one embodiment, the cloud IP tunnel server 140 only needs to implement the WireGuard management plan to manage WireGuard per-device keys and assign IPv6 addresses for the connected streaming devices and app containers. When the streaming manager 128 (or app server 116) launches a new docker container to run streaming application 130 (e.g., a Fire Operating System (FOS) app), the original container-to-host virtual network interface 122 is renamed as "eth1." The "eth1" interface is assigned with an IPv4 address that allows the app container 118 to communicate with a streaming video gateway 126. A new IPv6 address is assigned to this eth1 interface (122) to provide IPv6 connectivity between the app container 118 and the streaming device 102 for establishing the second IP tunnel 144 (GRE-TAP tunnel) through the first IP tunnel 142 (WireGuard tunnel). The IP-tunnel agent 134 in the app container 118 can be started to create a third virtual interface 120 (eth0) with the streaming device 102. In at least one embodiment, the third virtual interface 120 can be a GRE-TAP tunnel interface. The IPv4 address provided by the streaming device's IP-tunnel agent 138 is assigned to "eth0". The packets over the third virtual interface 120 (eth0) are processed and forwarded directly in the kernel mode GRE-TAP module. The second IP tunnel (GRE-TAP IP-tunnel) between streaming device 102 and app container 118 has two sections: the GRE-TAP over WireGuard connection between the streaming device 102 and the app server 116 (first virtual interface 104 to fourth virtual interface 24) and the raw GRE-TAP tunnel between the third virtual interface 120 and the fourth virtual interface 124. In at least one embodiment, the GRE packets inside the WireGuard connection are encrypted and protected by WireGuard cryptographic suite over the Internet 110. The raw GRE packets transmitted between app container 118 and the fourth virtual interface 124 (EC2 WireGuard server interface) are not encrypted. The packet forwarding and encryption/decryption over the fourth virtual interface 124 (EC2 WireGuard server interface) can be conducted in the kernel mode completely, which can improve performance for overall IP tunneling.

Figure 2:
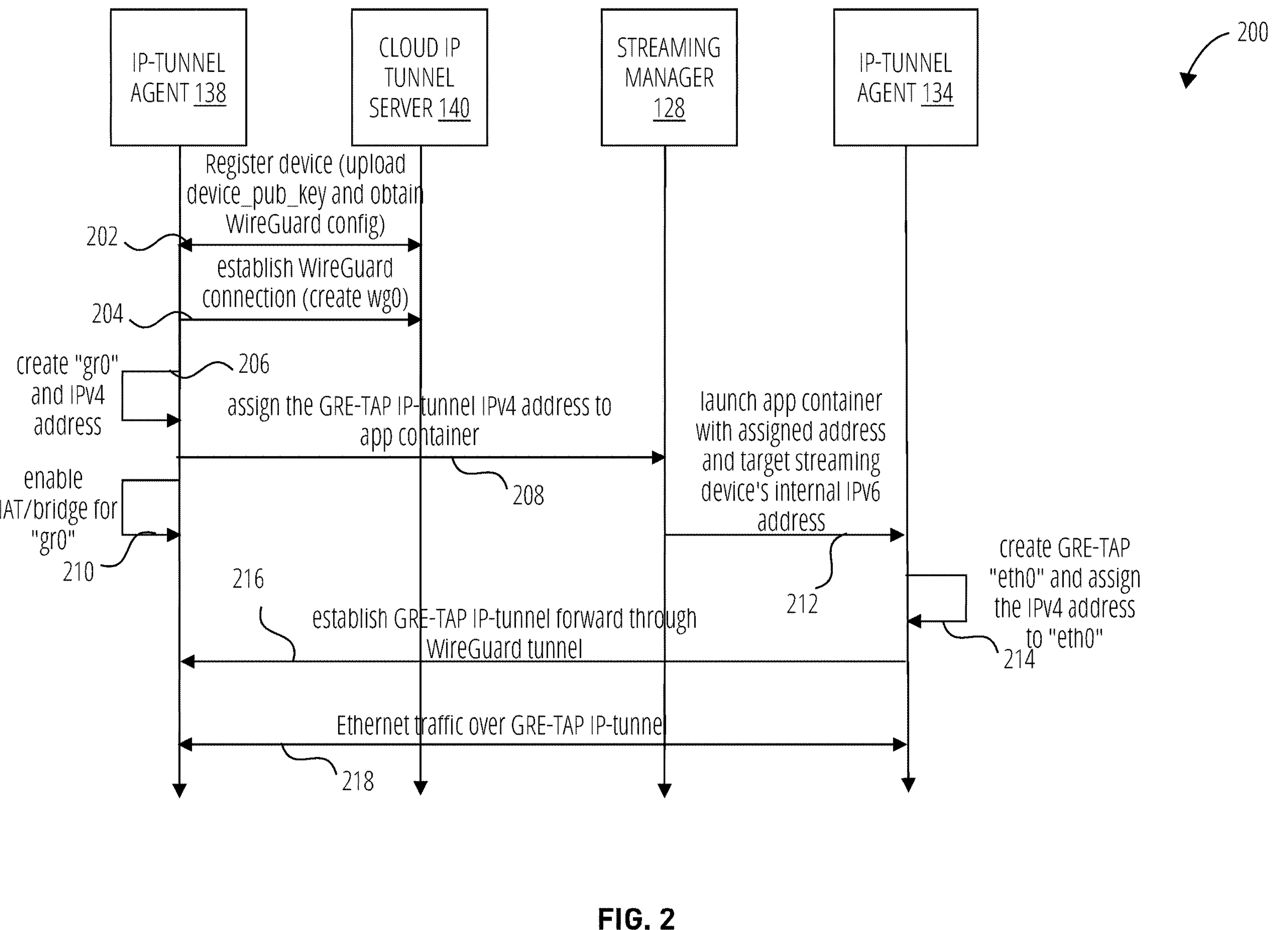
FIG. 2 is a sequence diagram of operations of an IP tunnel control and management plane according to at least one embodiment.

FIG. 2 is a sequence diagram of operations of an IP tunnel control and management plane 200 according to at least one embodiment. The IP-tunnel agent 138 on the streaming device 102 generates a per-device key pair (public and private keys) for the first IP tunnel (WireGuard tunnel). The IP-tunnel agent 138 registers with the cloud IP tunnel server 140 by uploading its public key through an existing secure channel (e.g., control channel 146), like a DTLS control channel 202 (or a TLS control channel). The cloud IP tunnel server 140 adds the streaming device 102 to a trusted-peer database and returns configuration information (e.g., WireGuard peer configuration), including the assigned IPv6 address to the streaming device 102. It should be noted that a user can already be registered with the third-party streaming service and have an account to the third-party streaming service. The registration referred herein is with respect to the cloud streaming service. It should be noted that a streaming device can register with the cloud streaming service by sharing information, such the device sharing its public key. The device can register with a Virtual Private Network (VPN) cloud server executed by a remote computing device.

After registration, the IP-tunnel agent 138 establishes the first IP tunnel (WireGuard tunnel) with the cloud IP tunnel server 140 (204) and applies the assigned IPv6 addressing over the created first virtual interface (wg0) (206). The IP-tunnel agent 138 generates or obtains an IPv4 address for the app container (206). The IPv4 address could be obtained from the local DHCP server if layer-2 (L2) bridging is used. Or the IPv4 address is a virtual internal IP address when NAT is in use. The IP-tunnel agent 138 passes a device identifier (device_ID) and the IPv4 address of the app container through the media player 136 on the streaming device 102 (208). An IPv6 address can also be provided in some cases. The IP-tunnel agent 138 applies the NAT routing or bridging configuration for the second virtual interface (gr0) (210). When a user launches the streaming application (cloud FOS app), the streaming manager 128 starts a new docker container to run the streaming application and passes the IPv4 address assigned to the app container and the IPv6 address of the streaming device 102 for the first IP tunnel to the IP-tunnel agent 134 running inside the container app (212). The IP-tunnel agent 134 establishes the second IP tunnel (GRE-TAP tunnel with the streaming device's IPv6 address for the first IP tunnel (WireGuard tunnel), creates the container-to-host virtual network interface 122 (GRE-TAP "eth0" interface) and applies the assigned IPv4 address to the container-to-host virtual network interface 122. The docker container's default network interface is renamed "eth1" for container-to-host communication. Now the second IP tunnel between the app container and the streaming device is established (216). The packets from the streaming application will be forwarded through the second IP tunnel (GRE-TAP tunnel) using the streaming device's local addressing.

In at least one embodiment, over the first IP tunnel (WireGuard tunnel), a private virtual IPv6 network can be formed to support the communication among streaming devices 102, cloud streaming cloud services, and app containers. The private network can be created using the same IPv6 subnets with predefined prefixes. To avoid the network address conflict with the end user's local IPv6 home network, global IPv6 prefixes can be used. An example of a 128-bit IPv6 address is illustrated and described below with respect to FIG. 3A.

Figure 3A:
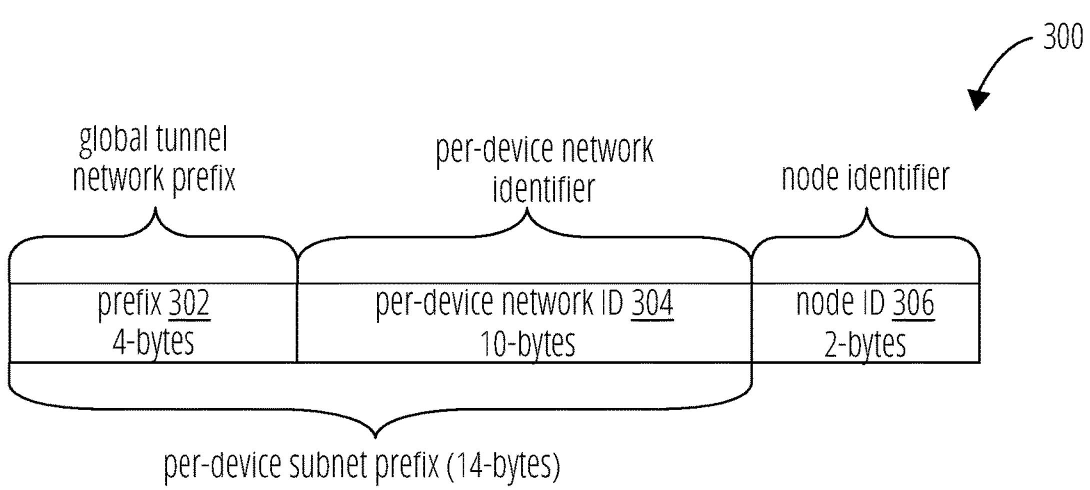
FIG. 3A illustrates an example IPv6 address according to at least one embodiment.

FIG. 3A illustrates an example IPv6 address 300 according to at least one embodiment. The IPv6 address 300 is an example of each internal IPv6 address (128 bits) for a streaming device. The IPv6 address 300 includes a global prefix 302 (e.g., 4 bytes), a per-device network ID 304 (e.g., 10 bytes), and a node ID 306 (e.g., 2 bytes). Each internal IPv6 address for the streaming device has a 4-byte global prefix 302 over the WireGuard tunnels with app server 116. Another different 4-byte prefix is assigned to app container 118 and a host-side docker bridge interface. For the example in FIG. 3B, the fourth virtual interface 124 (the cloud streaming EC2's WireGuard interface "wg0") is assigned address 2001:DB8::1/32, and the host-side docker bridge interface "docker0" has address 2102:DB8::1/32. Then inside the app server 116, the kernel mode IPv6 routing can be leveraged to forward the packets between the two subnets (2001:DB8::/32 and 2102:DB8::/32) for communication among app containers and corresponding streaming devices. The per-device network ID 304 can be a 10-byte per-device network ID assigned to each streaming device and its associated app container(s). As such, each streaming device can have its own private network with a 14-byte prefix (112 bits) to communicate with its app container(s) with the same network ID. The node ID 306 can be the remaining 2 bytes (16 bits) that provide a unique node ID for the streaming device or app container within the same per-device private network.

Figure 3B:
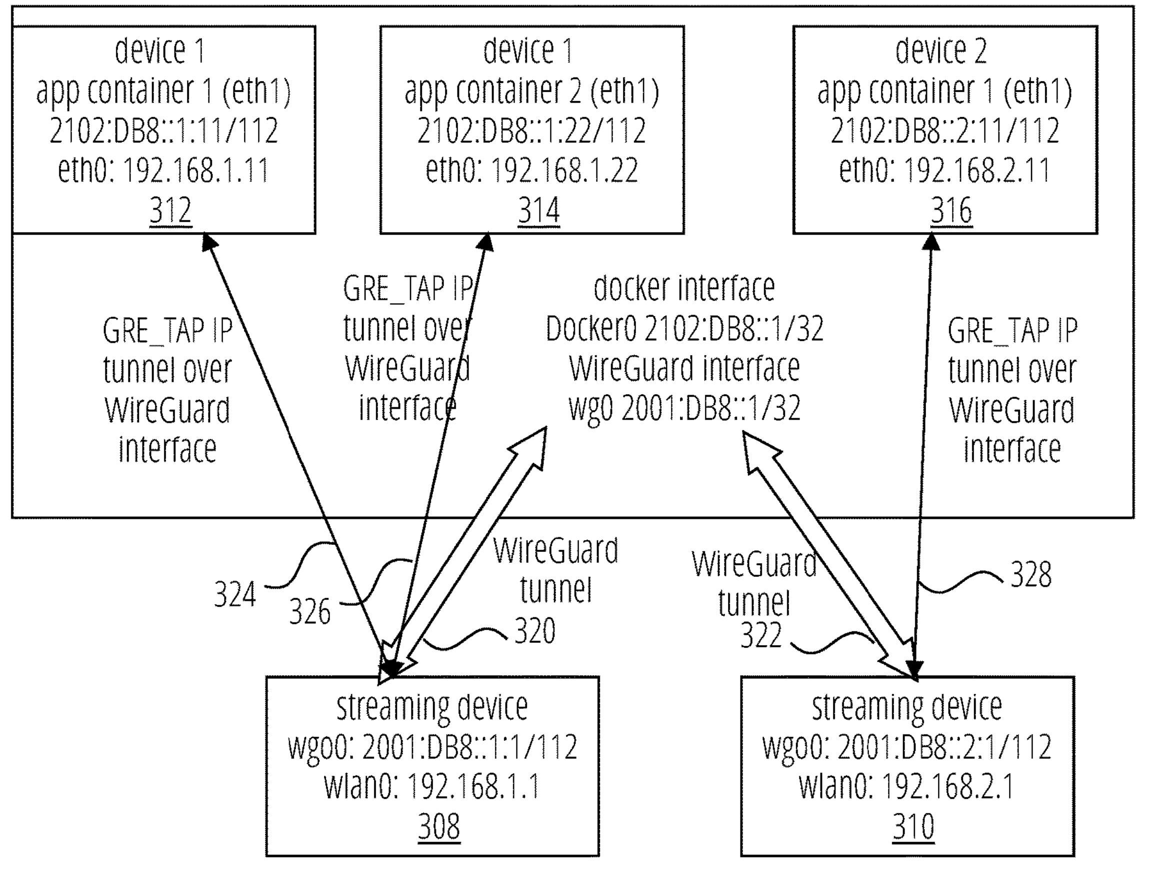
FIG. 3B illustrates an example of how the private IPv6 networks are used to create the inner GRE-TAP tunnels among streaming device 1, streaming device 2, and their app containers according to at least one embodiment.

FIG. 3B illustrates an example of how the private IPv6 networks are used to create the inner GRE-TAP tunnels among a streaming device 1 308, a streaming device 2 310, and their app containers (312-316) according to at least one embodiment. In this example, the streaming device 1 308 has address 2001:DB8::1:1/112 over a WireGuard tunnel 320. The cloud-based app container 1 312 and cloud-based app container 2 314 for the streaming device 1 have addresses 2002:DB8::1:11/112 and 2002:DB8::1:22/112, respectively. Through the internal WireGuard network over Docket interface eth1, the cloud-based app container 1 312 and cloud-based app container 2 314 can establish GRE-TAP tunnels 324, 326 with streaming device 1 308 (GRE-TAP tunnel pair: 2001:DB8::1:1↔2002:DB8::1:11 and 2001:DB8::1:1↔2102:DB8::1:22) and obtain the local home IPv4 address 192.168.1.11 and 192.168.1.22, respectively for their default eth0 interfaces. Through the Ethernet over IPv6 GRE-TAP tunnels 324, 326, the two cloud-based app containers 1 312 and 314 can access a local network of the streaming device 1 308 and the Internet using the streaming device's local IP addressing.

The streaming device 2 310 has address 2001:DB8::2:1/112 over the WireGuard tunnel 322. The cloud-based app container 1 316 associated with the streaming device 2 310 has address 2002:DB8::2:11/112. Through the internal WireGuard tunnel 322 over Docket interface eth1, the cloud-based app container 1 316 can establish the GRE-TAP tunnel 328 with streaming device 2 (2001:DB8::2:1↔2102:DB8::2:11) and obtain the streaming device's home network's local IPv4 address 192.168.2.11 for its default eth0 interface.

In at least one embodiment, since the WireGuard network within the same instance as the cloud streaming server needs to support multi-tenancy architecture, the following routing policy rules among the app containers and streaming devices have to be enforced to isolate the streaming devices and app containers belonging to different users: 1) An app containers can only communicate with its own streaming device to establish the GRE-TAP tunnel, other IPv6 traffic from/to the container's eth1 interface will be dropped. This IPv6 access rule is created inside the app container. For the example in FIG. 3B, streaming device 1's app container 1 312 (2102:DB8::1:11) can only communicate with streaming device 1 308 (2102:DB8::1:1) using GRE protocol (protocol ID 47). 2) The streaming devices can only communicate with their own app containers to establish the GRE-TAP tunnels, other IPv6 traffic from/to the device's wg0 interface will be dropped. This IPv6 access rule is created through the WireGuard AllowedIPS configuration option. For the example in FIG. 3B, streaming device 1 308 (2001:DB8::1:1) can only communicate with its app container's subnet (2102:DB8::1:0/112). 3) The cloud streaming server has routing rules to disallow any cross-device traffic. For example, the traffics from streaming device 1's subnets (2001:DB8::1:0/112 and 2102:DB8::1:0/112) cannot be forwarded to streaming device 2's subnets (2001:DB8::2:0/112 and 2102:DB8::2:0/112).

In the embodiment of FIG. 3B, the WireGuard tunnel server and cloud streaming server are executing inside the same instance. It is also possible that the WireGuard server is hosted on a different standalone instance, such as illustrated and described below with respect to FIG. 4.

Figure 4:
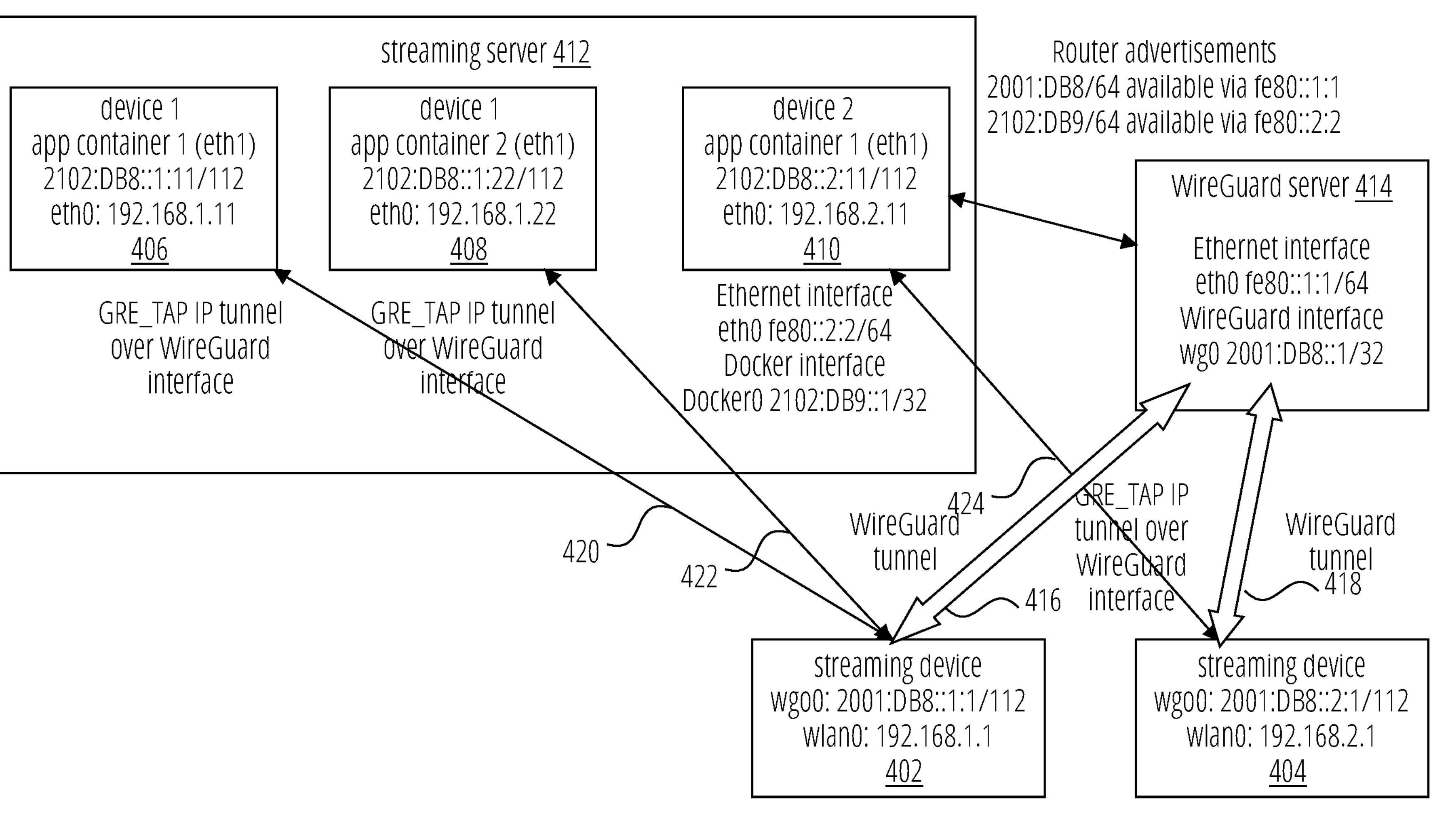
FIG. 4 illustrates an example of how the private IPv6 networks are used to create the inner GRE-TAP tunnels among streaming device 1, streaming device 2, and their app containers according to at least one embodiment.

FIG. 4 illustrates an example of how the private IPv6 networks are used to create the inner GRE-TAP tunnels among streaming device 1, streaming device 2, and their app containers according to at least one embodiment. In FIG. 4, the streaming devices 402 and 404 connect to WireGuard server 414 to establish WireGuard tunnels 416 and 418 to form the internal IPv6 subnet with the per-EC2 prefix 2001:DB8/64. The cloud streaming server 412 (e.g., EC2 server) launches the Docker containers using the per-EC2 prefix 2102:DB9/64. In order to let cloud streaming server 412 and WireGuard server 414 know how to forward packets between 2001:DB8/64 and 2102:DB9/64, the router advertisement daemons (radvd) running on the two instances broadcast ICMPv6 router advertisements (RA) over the EC2 ethernet interfaces. Through the RAs, WireGuard server 414 announces that 2001:DB8/64 is available over its link-local address fe80::1:1, and cloud streaming server 412 announces that 2102:DB9/64 is available over its link-local address fe80::2:2. After that, the IPv6 routing entries on the two servers are created automatically following the routing information in received RAs. Then the container instances in the cloud streaming server from the Docker subnet can reach out to the WireGuard subnet in WireGuard server 414 to establish the GRE-TAP tunnels 420, 422, 424, with the corresponding streaming devices 402, 404.

IP Tunnel Data Plane

Figure 5:
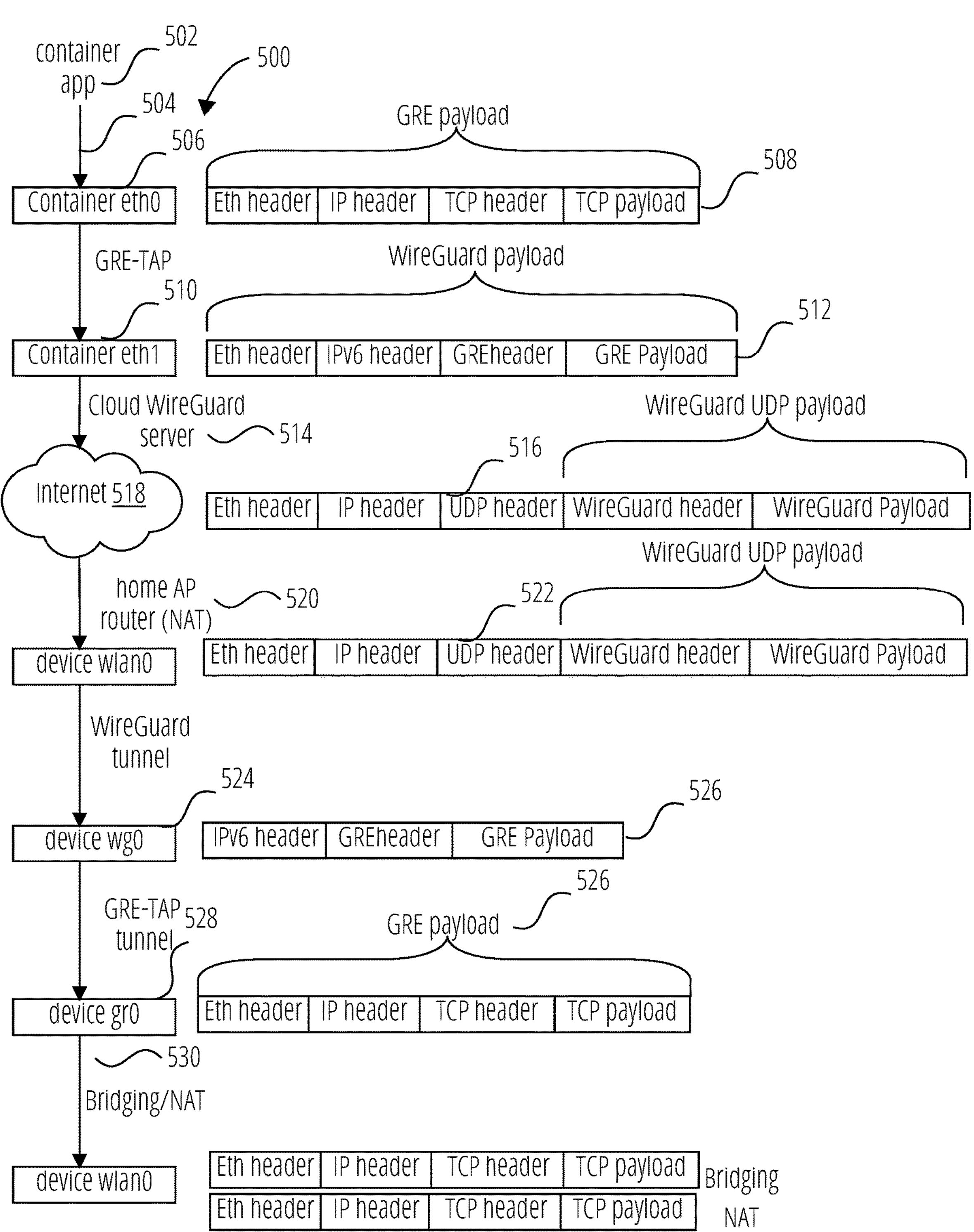
FIG. 5 illustrates a data plane of an IP tunnel for a container-to-device downlink flow according to at least one embodiment.

FIG. 5 illustrates a data plane of an IP tunnel for a container-to-device downlink flow 500 according to at least one embodiment. The following operations can be processed for the container-to-device downlink flow 500: The cloud-based app 502 sends a packet to a cloud server "1.1.1.1" using normal TCP socket API. Since "eth0" is the default interface for Internet access, the kernel mode TCP/IP stack 506 generates an IP packet 508 with eth0's IP address (10.0.0.2) as the source address and 1.1.1.1 as the destination address. The kernel mode GRE-TAP 510 in the container receives the raw Ethernet packet through the eth0 interface. The kernel mode GRE-TAP 510 encapsulates the Ethernet packet into an IPv6 GRE packet 512 and forwards it to a host server through eth1. The GRE packet has eth l's IPv6 address (2102:DB8::1:11) as the source address and the target streaming device (2001:DB8::1:1) as the destination IP. The EC2 host's kernel mode TCP/IP stack receives the IPv6 GRE packet 512 through the Docker interface "docker0." According to the routing table, the IPv6 GRE packet 512 is forwarded to the WireGuard interface "wg0." WireGuard kernel module 514 encrypts the IPv6 GRE packet 512, encapsulates it as an IPv4 UDP packet 516, and forwards it to the streaming device. Now after going out from a NAT router and over the Internet 518, the IPv4 UDP packet 522 uses the streaming server's public IP address (X.X.X.X) as the source address and the streaming device's public IP address (Y.Y.Y.Y) as the destination address. The home AP router 520 conducts NAT over the WireGuard UDP packet and forwards it to the streaming device. Now the IPv4 UDP packet 522 has streaming device wlan0's IP address (192.168.1.1) as the destination address. The streaming device's WireGuard kernel module 524 receives the IPv4 UDP packet 522. The WireGuard kernel module 524 decrypts the packet and removes the IPv4 and WireGuard UDP header to recover the original raw Ethernet IPv6 GRE payload 526 and then relays it to the GRE-TAP interface gr0. The kernel mode GRE-TAP 528 removes the IPv6 GRE header to recover the original Ethernet packet 530 generated by the cloud-based app. After NAT or bridging, the raw packet 530 is transmitted over the wlan0 interface with 192.168.1.1 (NAT mode) or 192.168.1.11 (bridging mode) as the source IP address and 1.1.1.1 as the destination IP address. The home AP router will forward it to a cloud server 1.1.1.1 of a third-party streaming service using the home network's public IP address (Y.Y.Y.Y).

Figure 6:
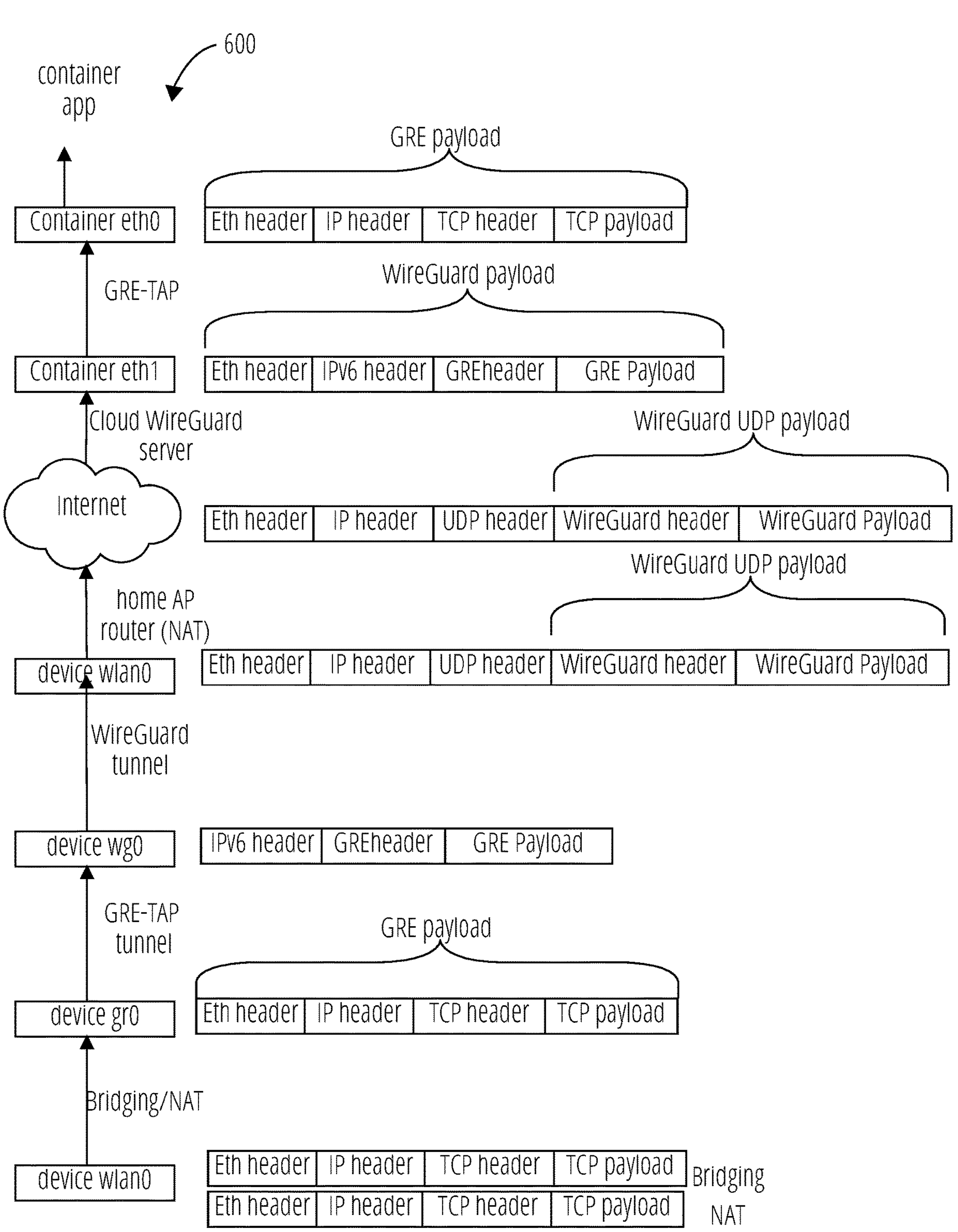
FIG. 6 illustrates a data plane of an IP tunnel for a device-to-container uplink flow according to at least one embodiment.

FIG. 6 illustrates a data plane of an IP tunnel for a device-to-container uplink flow 600 according to at least one embodiment. The device-to-container uplink flow 600 in FIG. 6 is the uplink packet flow (from 1.1.1.1 to 192.168.1.11), which follows similar operations with a reversed process order from the container-to-device downlink flow 500.

The network traffic of the cloud app container can have three categories: 1) HTTP/HTTPS for streaming; 2) Non-HTTP/HTTPS packets; and 3) Non-streaming HTTP/HTTPS packets. The downlink and uplink broadcast or multicast packets can be transmitted with the same process through the GRE-TAP tunnel over a WireGuard tunnel. The packets of a second category (i.e., non-HTTP/HTTPS) can go through the above native tunneling process to be delivered through the IP tunnel. For the packets of a third category (i.e., non-streaming HTTP/HTTPS), the packets need to be forwarded back to the container's IP tunnel agent by a video gateway before being sent to the IP tunnel. An example of this third category of packets is illustrated and described below with respect to FIG. 7.

Figure 7:
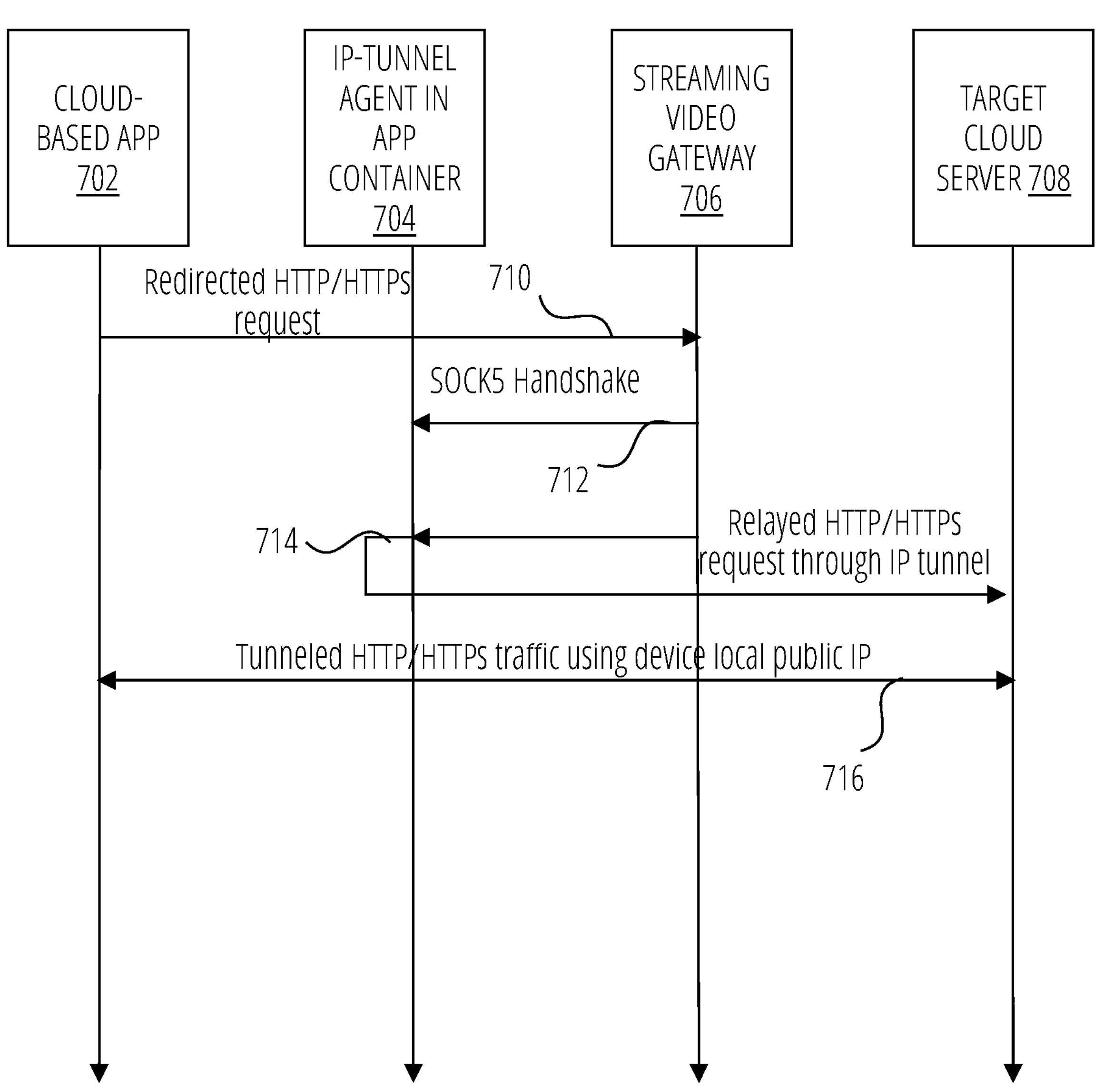
FIG. 7 illustrates a packet flow of a third category of packets according to at least one embodiment.

FIG. 7 illustrates a packet flow of a third category of packets according to at least one embodiment. A cloud-based app 702 can send an HTTP/HTTPS request 710 that is redirected to a streaming video gateway 706. The streaming video gateway 706 can decode the request 710 and detect whether it is for video streaming. Instead of directly relaying the request to the target cloud server 708 (i.e., the third-party streaming service), the streaming video gateway 706 uses a socket proxy (e.g., SOCK5 socket proxy) provided by the IP-tunnel agent in the app container 704 for the relaying. The IP-tunnel agent in app container 704 accepts a handshake 712 (SOCK5 handshake) from the streaming video gateway 706 through the eth1 interface. Then the IP-tunnel agent in app container 704 establishes a TCP connection 714 with the target cloud server 708 through the GRE-TAP IP tunnel to start forwarding the packets of an HTTP/HTTPS connection 716. Through transparent HTTP/HTTPS proxy in streaming video gateway 706 and SOCK5 socket proxy in IP-tunnel agent in app container 704, the cloud-based app 702 establishes the HTTP/HTTPS connection 716 with the target cloud server 708 over the GRE-TAP IP tunnel using streaming device's local public IP address.

IP Tunnel Agent in Streaming Device

Figure 8:
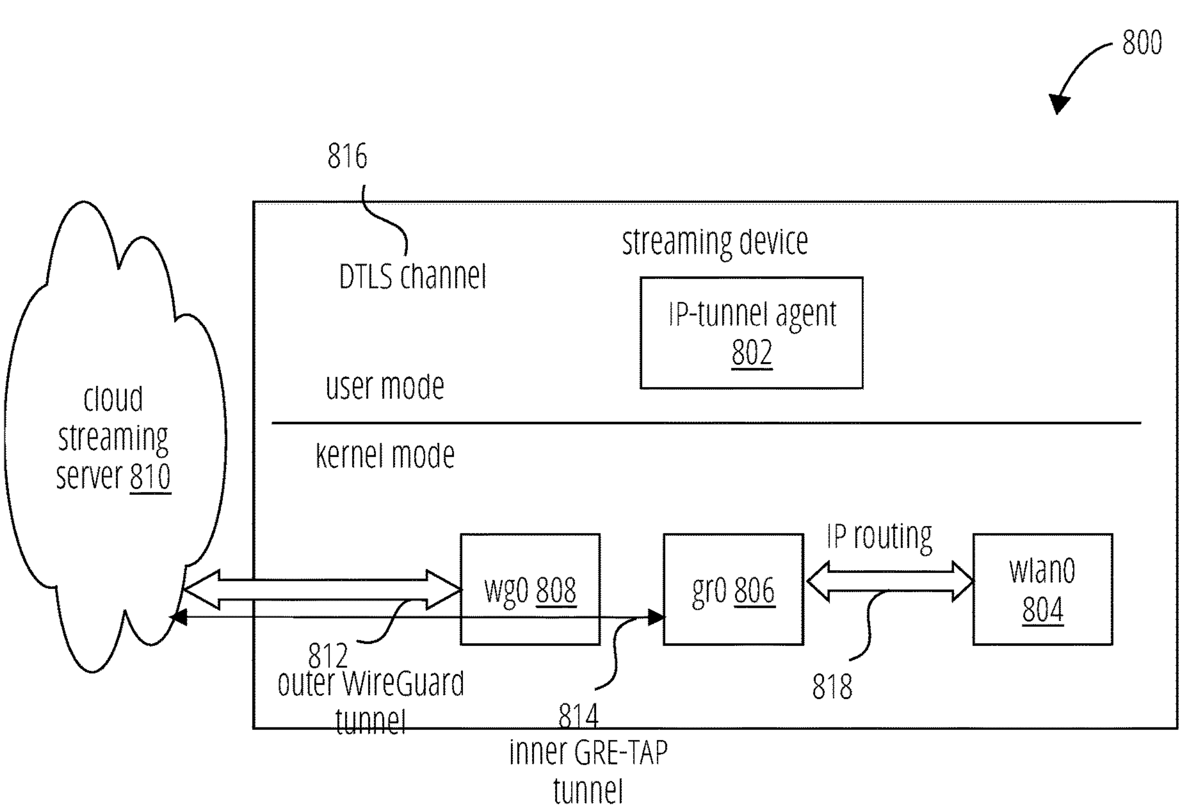
FIG. 8 illustrates components of an IP tunnel agent in a streaming device according to at least one embodiment.

FIG. 8 illustrates components of an IP-tunnel agent 802 in a streaming device 800 according to at least one embodiment. The IP-tunnel agent 802 implements a management plane to work with a cloud streaming server 810 to create two types of tunnels: an outer WireGuard IP tunnel 812 (WireGuard interface (wgo) 808) with a cloud IP tunnel server and an inner GRE-TAP tunnel 814 (GRE-TAP interface (grX) 806) with the app containers. The IP-tunnel agent 802 first generates public/private key pairs and registers the public key to the cloud IP tunnel server (cloud IP WireGuard tunnel server) through an existing cloud streaming DTLS channel 816 (or a TLS control channel). The cloud IP tunnel server adds the public key to its WireGuard interface (wg0) and returns a WireGuard configuration profile to the streaming device 800. The configuration specifies the per-device IPv6 address and the target app container's IPv6 addresses. The IP-tunnel agent 802 applies the configuration to create the WireGuard interface (wgo) 808 interface and establish the outer WireGuard IP tunnel 812. Using the returned app container's IPv6 addresses, the IP-tunnel agent 802 also creates the inner GRE-TAP tunnel 814 and corresponding GRE-TAP interfaces (grX) 806.

In at least one embodiment, the IP-tunnel agent 802 also calls the streaming device's NetworkManager to set up the kernel mode IP routing rules 818 between grX and a local interface 804 (e.g., wlan0 or eth0 if physical ethernet is in use). There are two routing modes: NAT mode or virtual bridging mode with BridgeD (BridgeD uses L3 policy routing to simulate L2 bridging). The IP-tunnel agent 802 can enable bridging mode by using a DHCP request to obtain a local IPv4 address from the home AP router. An IPv6 address can also be obtained. If the local IP address is available, the IP-tunnel agent 802 can send an Address Resolution Protocol (ARP) ping to a default gateway using this new IP address. The home network is verified to support the virtual bridging over the streaming device's wireless local area network (WLAN) interface if an ARP response is received. Then, the bridging mode will be used, and the obtained IP address can be assigned to the cloud app container through cloud streaming technology's DTLS channel 816 (or a TLS control channel). If either DHCP or ARP ping fails, the home network doesn't support bridging mode, and the IP-tunnel agent 802 falls back to enable NAT mode. In NAT mode, a virtual internal IPv4 address is selected by the IP-tunnel agent 802 and passed to cloud streaming server 810. Some WLAN networks, like Captive portal or Guest network, enforce client isolation to disable device-to-device communication, and therefore, LAN access is disallowed. On such networks, the cloud-based app can still use the streaming device's local IP addressing for Internet access through NAT mode.

In some embodiments, if multiple simultaneous cloud-based apps are required, the IP-tunnel agent 802 can create multiple IP addresses and multiple GRE-TAP interfaces and tunnels for those apps since the streaming manager launches a new container instance for each cloud-based app. Those cloud-based apps/containers can share the same WireGuard tunnel to create the inner GRE-TAP tunnel.

In some embodiments, since in bridging mode, multicast ICMPv6 packets like router solicitation (RS), router advertisement (RA), neighbor solicitation (NS) and neighbor advertisement (NA) will be forwarded over the IP tunnel, app containers can obtain IPv6 addresses from home network AP router using IPv6 SLAAC (Stateless Address Autoconfiguration). As such, IPv6 based apps like Matter can be supported through the IP tunnel.

In at least one embodiment, to avoid forwarding unnecessary multicast packets from the local home network to cloud containers in bridging mode, BridgeD should conduct multicast IGMP/MLD snooping to learn which multicast group traffic the cloud containers receive. Then only the relevant multicast packets on LAN will be forwarded to cloud containers.

Cloud IP Tunnel Server

Figure 9:
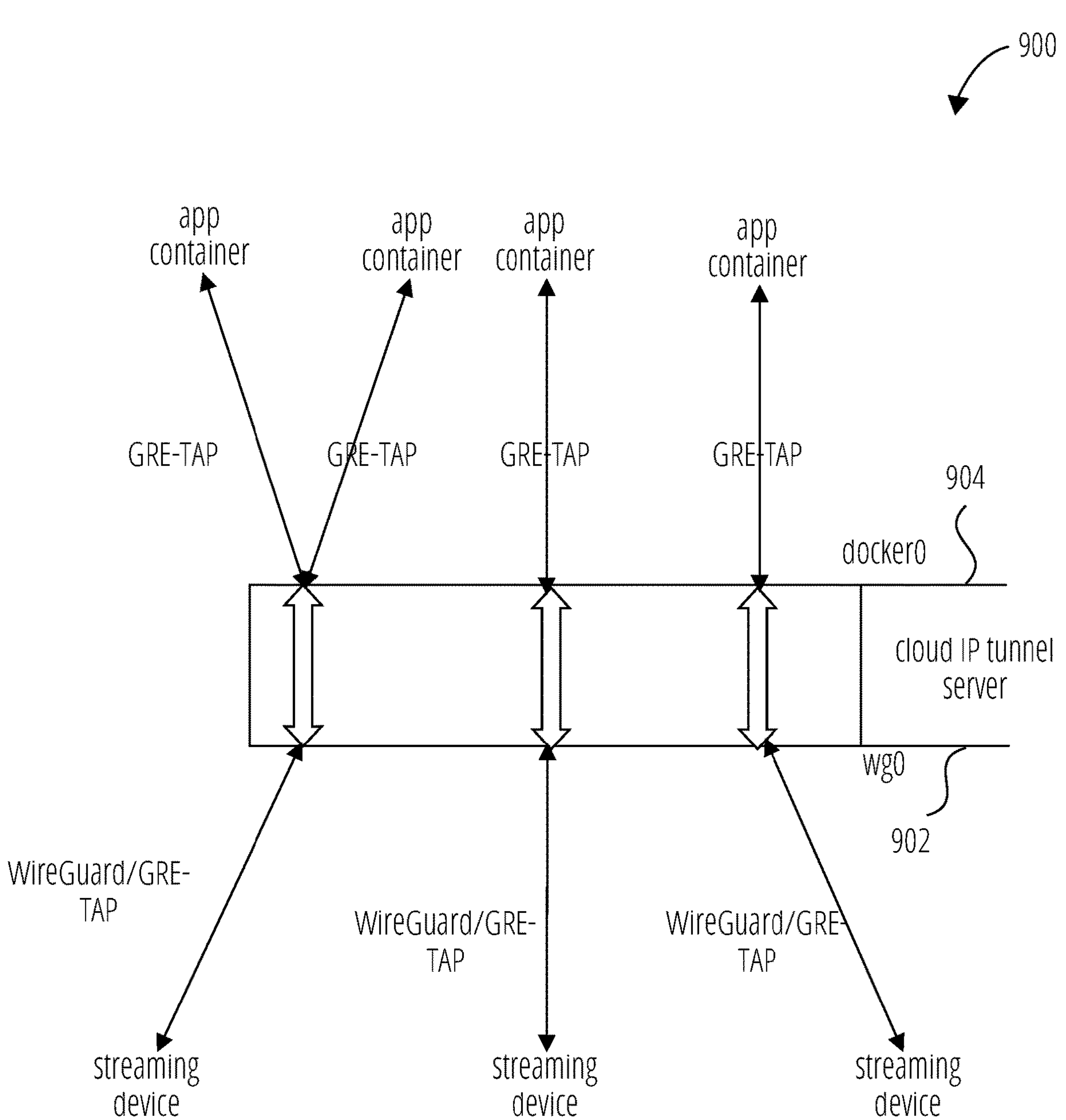
FIG. 9 illustrates packet forwarding managed by a cloud IP tunnel server according to at least one embodiment.

FIG. 9 illustrates packet forwarding managed by a cloud IP tunnel server 900 according to at least one embodiment. The cloud IP tunnel server 900 running in a host (e.g., EC2 instance) manages the WireGuard tunnel with the streaming devices through the Internet over the WireGuard wg0 interface 902. It also works with a container manager to manage IPv6 addresses for Docker virtual network interfaces of the app containers within the host. The cloud IP tunnel server 900 creates the routing rules to leverage kernel mode IP routing to forward the IPv6 packets between streaming devices and app containers over the Docker network interface 904 ("docker0") and WireGuard wg0 interface 902.

In at least one embodiment, the cloud IP tunnel server 900 manages a WireGuard key store to accept the public keys from the streaming device. When a streaming device is connected to the cloud streaming server, it will register its public key to the key store through the DTLS control channel (or a TLS control channel). The cloud IP tunnel server 900 can apply the public key to the cloud streaming server's wg0 interface and return a WireGuard configuration profile to the streaming device. The profile includes the IPv6 address assigned to the device and the associated app containers' IPv6 subnet, which the streaming device can access. And then streaming device's IP-tunnel agent can automatically establish the WireGuard IP tunnel with the cloud server and the GRE-TAP interfaces with its allocated app containers.

IP-Tunnel Agent in App Container

FIG. 10 illustrates components of an IP-tunnel agent 1002 in an app container 1014 of an app server 1000 according to at least one embodiment. After the app container 1014 is launched, the IPv6 address for tunneling is assigned to the Docker interface eth1. The IP-tunnel agent 1002 in the app container 1014 is assigned with the target streaming device's IPv6 address over the WireGuard network. Using the streaming device's IPv6 address as the remote address and eth1's IPv6 address as a local address, the IP-tunnel agent 1002 creates a virtual GRE-TAP tunnel interface "eth0." The "eth0" interface is configured with the IPv4 address assigned by the streaming device. After that, the IPv4 packets of the eth0 interface will be encapsulated into IPv6 GRE-TAP packets and forwarded between Docker/WireGuard interfaces on the host side and Docker interface eth1 on the container side. To allow the container's IP-tunnel agent 1002 to manage the network interface for tunneling, the NET_ADMIN and NET_RAW Linux capabilities shall be assigned to the Docker instance. The IP-tunnel agent 1002 in the app container 1014 can also run as a SOCKS5 socket proxy server for the video gateway. When the video gateway intercepts an HTTP/HTTPS connection from the cloud-based app, the video gateway can initiate a SOCKS5 handshake with the container's IP-tunnel agent 1002 to relay the HTTP/HTTPS connection through the GRE-TAP IP tunnel, as described above. Then the HTTP/HTTPS connection can use the streaming device's local public IP address to communicate with the target cloud server (e.g., third-party cloud servers).

Resource Mapping Over the Ip Tunnel

Other use cases can be supported over the IP tunnel between the streaming device and the app container on the cloud. Some cloud-based apps may need to access the local resources on streaming device. With the IP tunnel, such remote access can be fulfilled over IP through the GRE-TAP over the WireGuard tunnel. Two examples are illustrated and described below with respect to FIG. 11.

Figure 11:
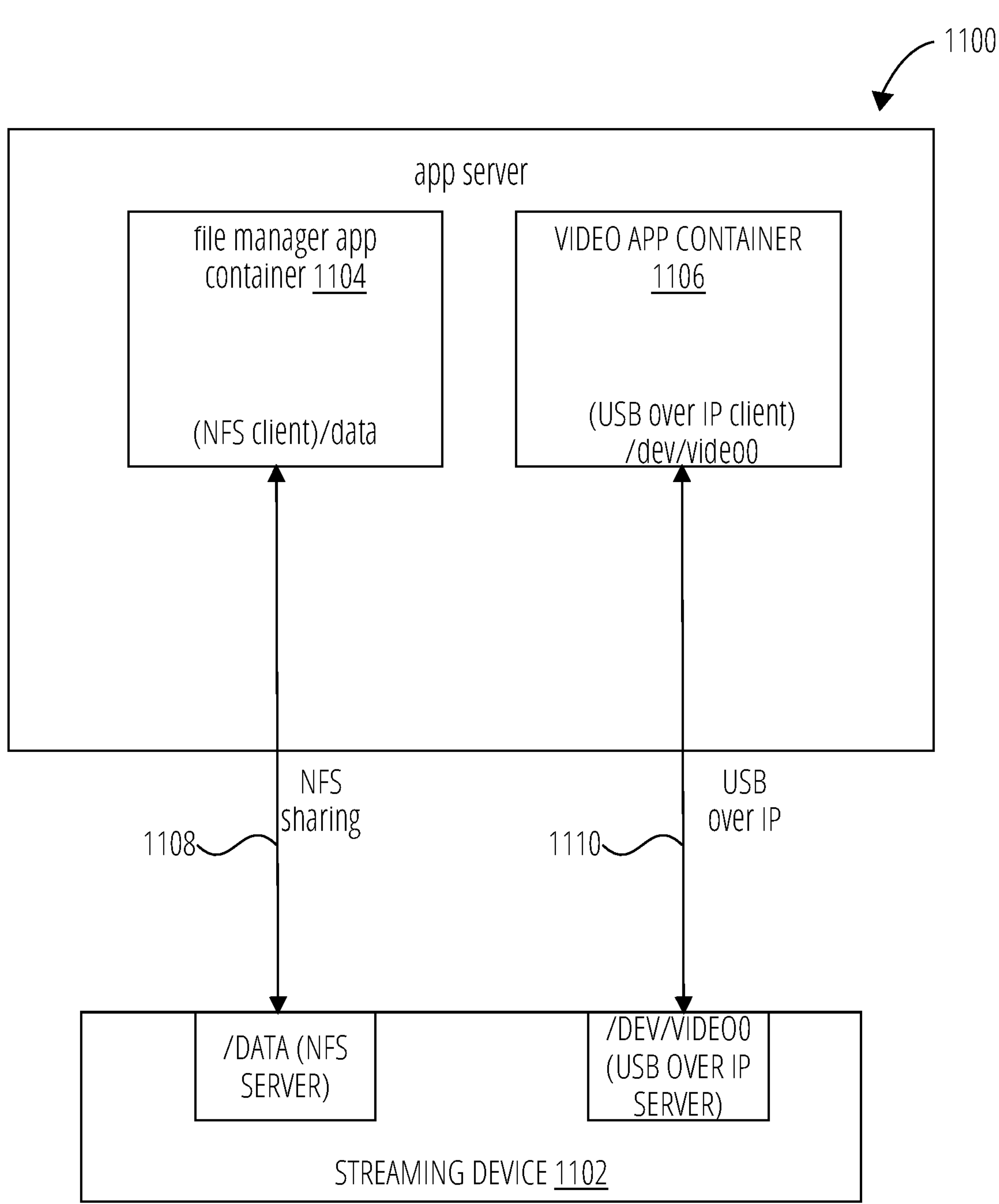
FIG. 11 illustrates an app server having a file manager app container and a video app container that can access local resources on the streaming device according to at least one embodiment.

FIG. 11 illustrates an app server 1100 having a file manager app container 1104 and a video app container 1106 that can access local resources on a streaming device 1102 according to at least one embodiment. The file manager app container 1104 can access streaming device's local folders and files through NFS sharing. The video app container 1106 can access the USB camera attached to the streaming device using USB over IP. Such remote mapping can be transparent to the third-party apps running on the cloud since those file storage and attached USB device are mapped as native local resources in the Docker container. FIG. 11 shows the remote resource mappings like NFS sharing 1108 and USB over IP 1110 between streaming device 102 and app containers 1104, 1106, respectively.

FIG. 12 is a flow diagram of a method 1200 of establishing two IP tunnels with a remote computing device according to at least one embodiment. The method 1200 may be performed by processing logic that may comprise hardware (e.g., circuitry, dedicated logic, programmable logic, microcode, etc.), software (such as instructions running on the processor), firmware, or a combination thereof. In one embodiment, a computing system of a cloud computing system performs the method 1200. In at least one embodiment, one or more processors perform the method 1200. Alternatively, other components of disclosed devices may perform some or all operations of the method 1200.

With further reference to FIG. 12, the method 1200 may begin with the processing logic receiving a request to execute a streaming application hosted on a remote computing device (block 1202). At block 1204, the processing logic creates a first virtual interface. An IPv6 address is assigned to the first virtual interface and associated with a private network with a container executing the streaming application on the remote computing device. At block 1206, the processing logic establishes a first Internet Protocol (IP) tunnel with the remote computing device. The first IP tunnel is a layer-3 tunnel. At block 1208, the processing logic creates a second virtual interface. In block 1210, the processing logic sends, to the remote computing device, a device identifier associated with the device and an IPv4 address assigned to the streaming application. The IPv4 address is associated with a local network. The device is part of the local network. At block 1212, the processing logic establishes a second IP tunnel with the container. The second IP tunnel is a layer-2 Ethernet-over-IP tunnel. At block 1214, the processing logic establishes routing between the second virtual interface and a local network interface of the device. At block 1216, the processing logic communicates data with the streaming application over the second IP tunnel.

In a further embodiment, the processing logic receives user input comprising a selection of the streaming application. The processing logic registers the device with a Virtual Private Network (VPN) cloud server executed by the remote computing device. The processing logic receives configuration information from the VPN cloud server, the configuration information including the IPv6 address associated with the device.

In at least one embodiment, the processing logic can generate a key pair comprising a private key and a public key for the first IP tunnel and send the public key to the VPN cloud server through a secure channel between the device and the remote computing device. The secure channel is different from the VPN tunnel and the Ethernet-over-IP tunnel.

In at least one embodiment, the processing logic establishes the first IP tunnel by creating the first virtual interface using a VPN protocol, such as the WireGuard protocol. The processing logic establishes the second IP tunnel by creating the second virtual interface using an Ethernet-over-IP protocol, such as the GRE protocol.

In at least one embodiment, the processing logic enables routing between the second virtual interface and the local network interface by establishing at least one of a bridge mode or NAT mode between the second virtual interface and the local network. The local network interface can be a LAN interface or a WLAN interface.

In at least one embodiment, the processing logic obtains the IPv4 address from a DHCP server that is part of the local network. The processing logic sends the IPv4 address over a secure channel to a streaming manager executed by the remote computing device. The streaming manager can launch the container with the IPv4 address assigned to the streaming application and the IPv6 address assigned to the first virtual interface. In other embodiments, the IPv4 address and an IPv6 address can be provided.

In at least one embodiment, the processing logic receives and accepts a request from the streaming application through the first IP tunnel. Acceptance of the request establishes the second IP tunnel between the second virtual interface and the streaming application through the first IP tunnel. The processing logic provides at least one LAN access or Internet access to the streaming application through the second IP tunnel using the IPv4 address assigned to the streaming application (i.e., using the streaming device's local network addressing). The local network interface is at least one of a LAN or WLAN interface.

In at least one embodiment, the processing logic performs, in a kernel mode, packet forwarding between the first virtual interface, the second virtual interface, and the local network interface. The processing logic receives, in a user mode, configuration information from a VPN cloud server executed by the remote computing device, the configuration information including the IPv6 address associated with the device. The processing logic sends, in the user mode, a public key to the VPN cloud server through a secure channel between the device and the remote computing device.

In at least one embodiment, the processing logic communicates data with the streaming application over the second IP tunnel in a downlink packet flow. In the downlink packet flow, the processing logic receives a UDP packet from an AP router that is part of the local network. The UDP packet includes a destination address that specifies an IP address associated with the local network interface. The processing logic decrypts the UDP packet and removes an IPv4 header and a UDP header of the UDP packet to obtain an Ethernet IPv6 payload. The processing logic routes the Ethernet IPv6 payload to the second virtual interface. The processing logic remotes the IPv6 header to obtain an Ethernet packet generated by the streaming application. The processing logic transmits, to the AP router, the Ethernet packet over the local network interface with a source address that specifies the IPv4 address and a destination address that specifies a third-party streaming service. The AP router forwards the Ethernet packet to the third-party streaming service using a public IP address associated with the local network.

In at least one embodiment, the processing logic communication data with the streaming application over the second IP tunnel within an uplink packet flow. In the uplink packet flow, the processing logic receives, from an AP router that is part of the local network, an Ethernet packet over the local network interface with a source address that specifies a third-party streaming service and a destination address that specifies the IPv4 address. The AP router receives the Ethernet packet from the third-party streaming service using a public IP address associated with the local network. The processing logic routes the Ethernet packet to the second virtual interface. The processing logic adds an IPv6 header to the Ethernet packet to obtain an Ethernet IPv6 payload. The processing logic encrypts the Ethernet IPv6 payload and adds an IPv6 header and a UDP header to obtain an UDP packet. The processing logic sends the UDP packet to the AP router. The UDP packet includes a destination address that specifies a public IP address associated with the remote computing device.

In at least one embodiment, an incoming packet includes a first Ethernet header and a first IP header including a source address that specifies a public IP address associated with the remote computing device and a destination address that specifies an IP address associated with the local network interface. The incoming packet also includes a UDP header, a first header associated with the first IP tunnel, an IPv6 header comprising a source address that specifies an IPv6 address associated with a local network interface of the remote computing device, and a destination address that specifies the IPv6 address assigned to the first virtual interface, a second header associated with the second IP tunnel, a second Ethernet header, a second IP header comprising a source address that specifies the IPv4 address assigned to the streaming application and a destination address that specifies a public IP address associated with a third-party streaming service, a TCP header, and a TCP payload.

In at least one embodiment, an outgoing packet includes a first Ethernet header and a first IP header comprising a source address that specifies an IP address associated with the local network interface and a destination address that specifies a public IP address associated with the remote computing device. The outgoing packet also includes a UDP header, a first header associated with the first IP tunnel, an IPv6 header comprising a source address that specifies the IPv6 address assigned to the first virtual interface and a destination address that specifies an IPv6 address associated with a local network interface of the remote computing device, a second header associated with the second IP tunnel, a second Ethernet header, a second IP header comprising a source address that specifies a public IP address associated with a third-party streaming service and a destination address that specifies the IPv4 address assigned to the streaming application, a TCP header, and a TCP payload.

TUN/TAP and DTLS Based IP Tunnel Solution

The embodiments described above are directed to two IP tunnels, such as an outer WireGuard IP tunnel and a GRE-TAP tunnel. This architecture implements the management and data planes for device IP tunneling. This architecture leverages Linux native kernel mode WireGuard and GRE-TAP modules to establish the IP tunnel between a cloud app container and a streaming device, avoiding excessive user mode packet forwarding.

The following embodiments are directed to using an existing DTLS secure channel for IP tunneling. The tunnel's IP addressing is managed end-to-end between the streaming device back to the streaming device transparently to the cloud streaming server on the host instance. This can simplify the implementation of security and management planes of the IP tunnel. But since all of the data plane is built on top of user mode TUN/TAP stack, it involves user mode packet copying during forwarding the IP packets all the way through the cloud app container, host, and streaming device. Especially for HTTP/HTTPS from the streaming application, user-mode packet copying and forwarding needs to be conducted multiple times (e.g., 4 times on the cloud and one time on the streaming device) (e.g., App↔video gateway↔Container SOCK5 proxy↔Container tunnel agent↔Cloud tunnel server↔Vega device tunnel agent). Excessive user mode packet forwarding may cause concerns regarding extra central processing unit (CPU) resource consumption and packet transmission latency.

In these embodiments, in order to establish the IP tunnel between the cloud app container and streaming device, three new components are introduced: a cloud IP tunnel server, an IP-tunnel agent inside the app container, and an IP-tunnel agent inside the media player on the streaming device, such as illustrated and described below with respect to FIG. 13.

Figure 13:
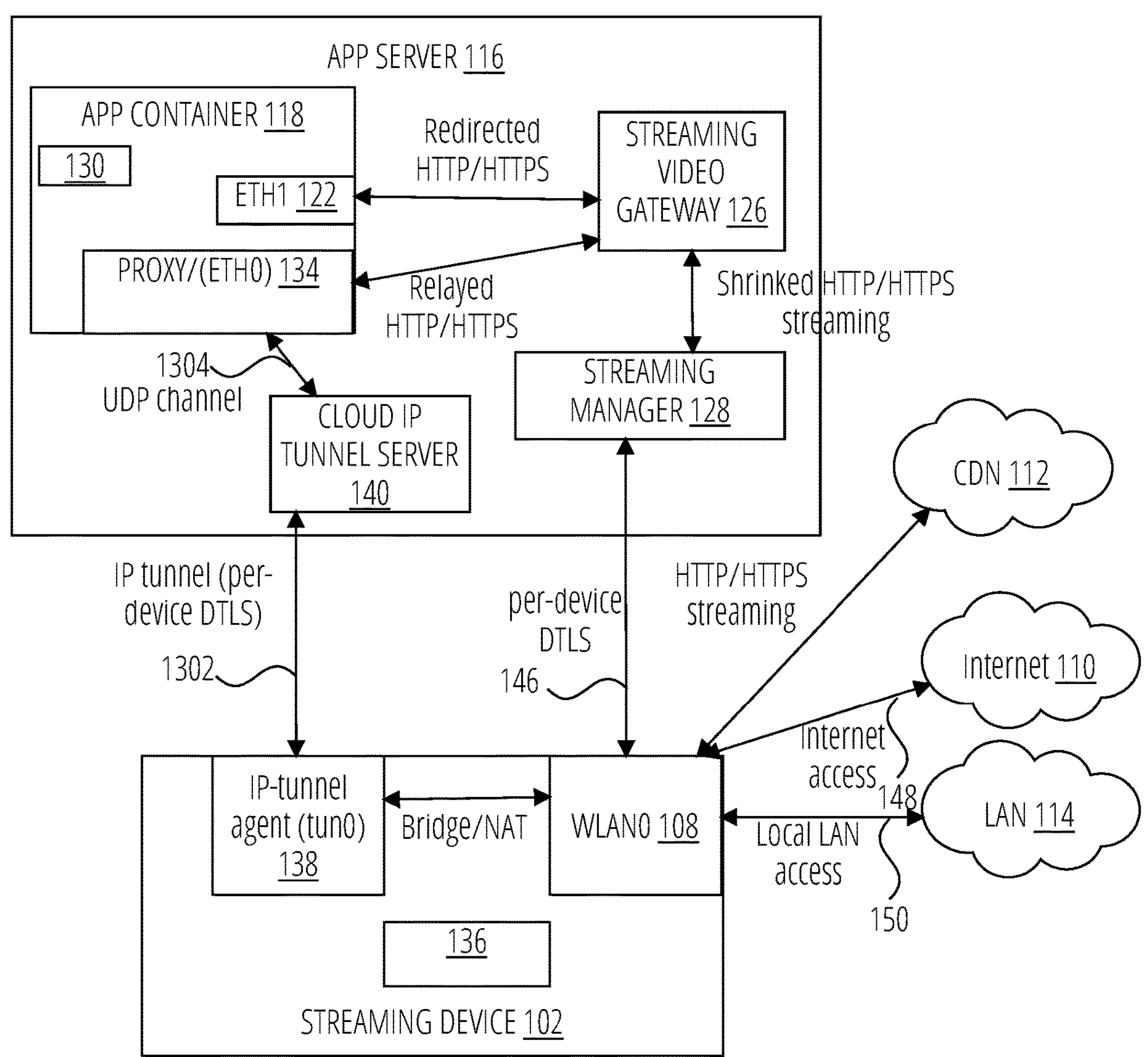
FIG. 13 is a network diagram of an architecture with a Datagram Transport Layer Security (DTLS)-based IP tunnel for a streaming application, hosted by a remote computing device, to operate as part of a local network of a streaming device according to at least one embodiment.

FIG. 13 is a network diagram of an architecture with a DTLS-based IP tunnel for a streaming application 130, hosted by the remote computing device 132, to operate as part of the local network of the streaming device 102 according to at least one embodiment. Similar components are being used from the architecture of FIG. 1, as noted by similar reference numbers except where indicated.

Besides the current per-app cloud streaming DTLS connection over the control channel 146, the IP-tunnel agent 138 of FIG. 13, launched by the media player 136 on the streaming device 102, establishes another per-device IP-tunnel DTLS connection (IP tunnel 1302) with the cloud IP tunnel server 140 on the app server (e.g., AWS EC2 instance). A new virtual ethernet interface tun0 is created on the streaming device 102 using Linux TUN/TAP application programming interface (API). The "tun0" interface is connected with the upstream local network interface 108 ("wlan0" or "eth0" interface when Ethernet is in use) through layer-3 NAT routing or virtual layer-2 bridging using BridgeD, which provides the local IP addressing access for the cloud app container 118. From the IP-tunnel DTLS connection over the control channel 146, the IP-tunnel agent 138 receives the Ethernet packets originated by cloud app container 118 and writes them into the "tun0" interface. The IP-tunnel agent 138 can also read the raw Ethernet packets targeted to cloud app container 118 from "tun0" and forwards them to the cloud IP tunnel server 140 through the IP-tunnel DTLS connection (IP tunnel 1302). The IP-tunnel agent 138 can create an internal virtual IPv4 address if NAT is used or obtain a new local IPv4 address from the DHCP server on the home local network. This address is assigned to cloud app container 118 through the existing DTLS control channel (control channel 146).

In at least one embodiment, on the cloud side, the cloud IP tunnel server 140 manages the IP-tunnel DTLS connections with the streaming devices. The cloud IP tunnel server 140 can also have a pre-defined virtual IP address in the virtual private cloud (VPC) exposed to all cloud app containers. When the streaming manager 128 (or app server 116) launches a new docker container to run streaming application 130 (e.g., a FOS app), the original container-to-host virtual network interface 122 is renamed as "eth1." The "eth1" is only used for container-to-host communication to allow the app container 118 to communicate with the streaming video gateway 126 and the cloud IP tunnel server 140. The IP-tunnel agent 134 in the app container 118 can be started to create the virtual "eth0" network interface. The IP address provided by IP-tunnel agent 138 is assigned to "eth0". The FOS connectivity manager uses the "eth0" interface as the default Ethernet network interface for general Internet access 148 and LAN access 150. The IP-tunnel agent 134 in app container 118 can establish a UDP channel 1304 to cloud IP tunnel server 140 to forward the raw Ethernet packets received from "eth0". The cloud IP tunnel server 140 also relays the received raw packets from the corresponding DTLS connection (control channel 146) to the container's IP tunnel agent 134 through the UDP channel 1304.

Each IP tunnel between a streaming device and a cloud app container has two sections: the DTLS connection between streaming device 102 and cloud IP tunnel server 140, and the UDP channel 1304 between cloud IP tunnel server 140 and cloud app container 118. The packets inside the DTLS connection (control channel 146) can be encrypted and protected by DTLS over Internet. The packets in the UDP channel 1304 are not encrypted since they are transmitted only within the VPC. In other embodiments, the architecture can include a TLS-based IP tunnel for the streaming application 130, hosted by the remote computing device 132, to operate as part of the local network of the streaming device 102.

Figure 14:
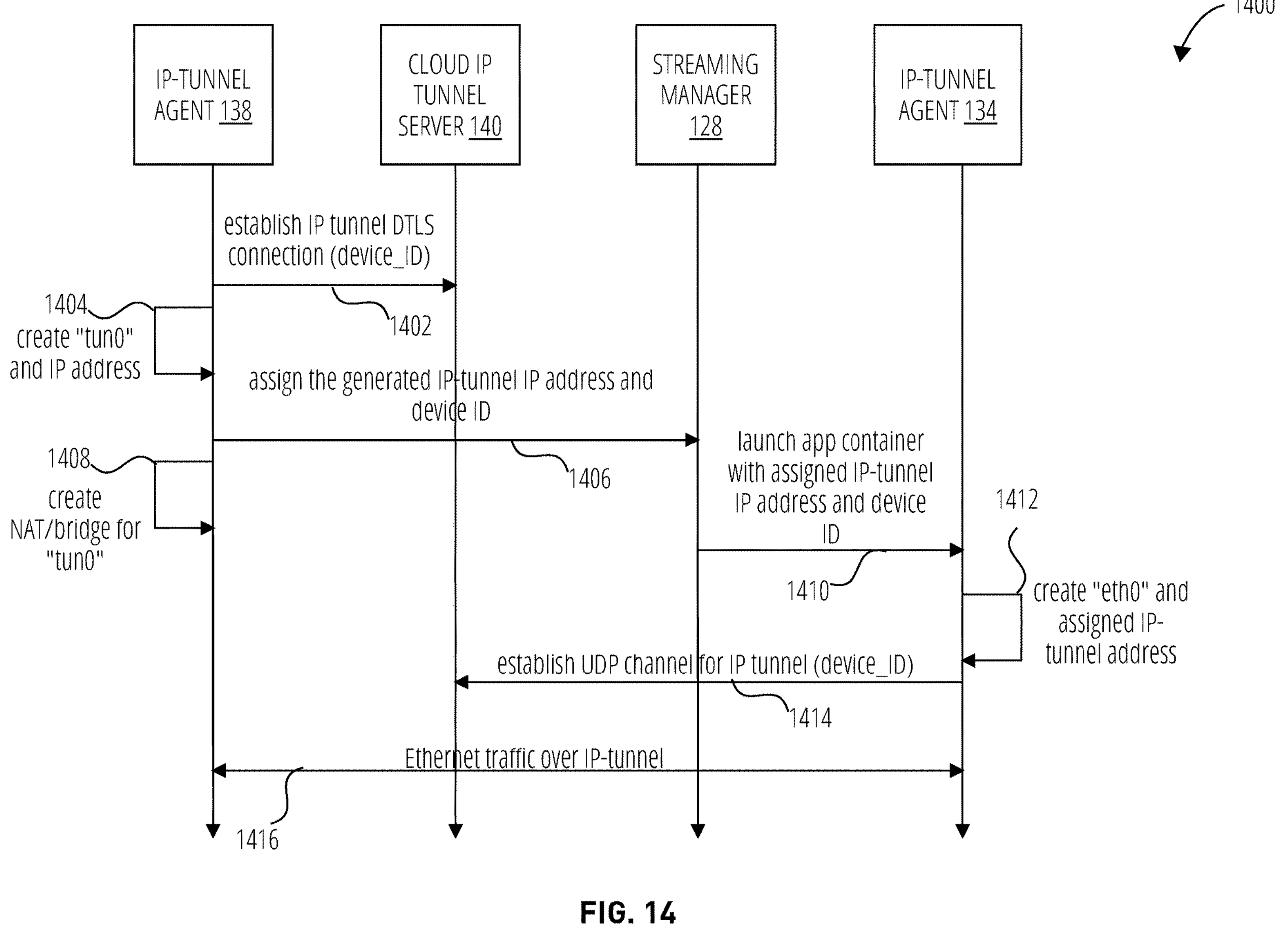
FIG. 14 is a sequence diagram of operations of an IP tunnel control and management plane according to at least one embodiment.

FIG. 14 is a sequence diagram of operations of an IP tunnel control and management plane 1400 according to at least one embodiment. The IP-tunnel agent 138 on the streaming device 102 generates and establishes a DTLS connection with cloud IP tunnel server 140 through mutual TLS authentication (1402). During the DTLS handshake, the cloud IP tunnel server 140 obtains the streaming device's unique device ID from the per-device certificate used by the streaming device 102. The IP-tunnel agent 138 creates a network interface, "tun0," through the Linux TUN/TAP API (1404). The IP-tunnel agent 138 generates an IP address for the cloud app container 118. The IP address could be obtained from the local DHCP server if L2 bridging is in use, or the IP address is a virtual internal IP address when NAT is in use. The IP-tunnel agent 138 passes a device identifier (device_ID) and the generated IP address of the app container 118 to the streaming manager 128 through the media player 136 on the streaming device 102 (1406). The IP-tunnel agent 138 applies the NAT routing or bridging configuration for the network interface ("tun0") (1408). When a user launches the streaming application (cloud FOS app), the streaming manager 128 starts a new docker container to run the streaming application (1410). The IP address and device identifier (device-ID) obtained at 1406 are passed to the IP-tunnel agent 134 inside the app container 118. The IP-tunnel agent 134 in the app container 118 creates the container-to-host virtual network interface 122 ("eth0" interface) and applies the assigned IP address to the container-to-host virtual network interface 122 (1412). The docker container's default network interface is renamed "eth1" for container-to-host communication. The IP-tunnel agent 134 can establish a UDP channel with cloud IP tunnel server 140 through the "eth1" interface (1414). The IP-tunnel agent 134 can share with the cloud IP tunnel server 140 the device identifier to all the cloud IP tunnel server 140 to associate the UDP channel with the corresponding DTLS tunnel connection having the same device identifier. Now the IP tunnel between cloud app container 118 and the streaming device 102 is established (1416). The IP tunnel agents 134 and 138 in cloud app container 118 and streaming device 102 can start forwarding the IP packets through the IP tunnel cloud server.

IP Tunnel Data Plane

The network traffic of cloud app containers can have three categories: 1) HTTP/HTTPS for streaming; 2) Non-HTTP/HTTPS packets; and 3) Non-streaming HTTP/HTTPS packets. The packets of first category are processed through the existing cloud streaming path. The 2nd and 3rd categories will be forwarded through the IP tunnel. Then all three packet categories will use local home network addressing for Internet and LAN communications.

Figure 15:
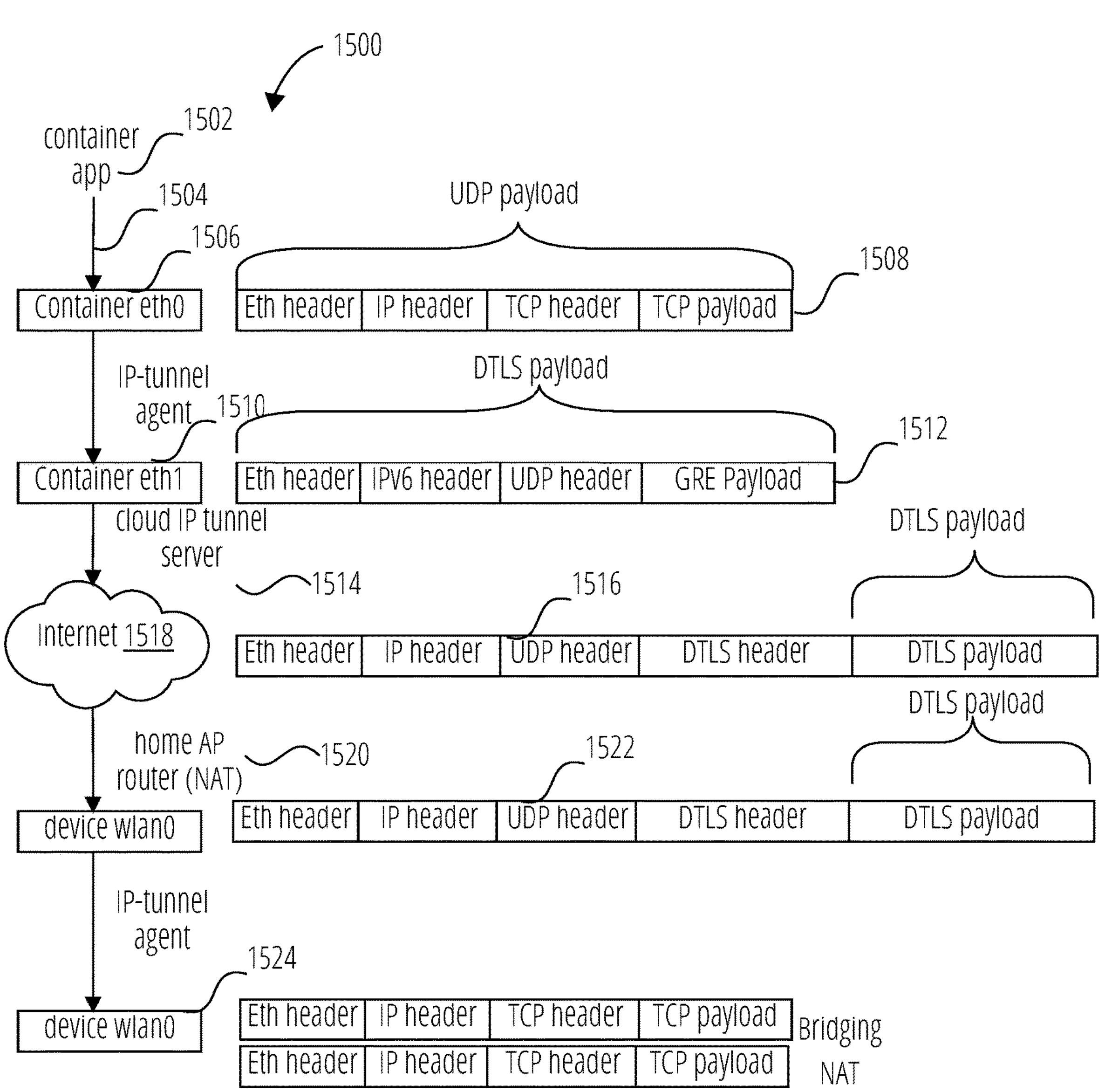
FIG. 15 illustrates a data plane of an IP tunnel for a container-to-device downlink flow according to at least one embodiment.

FIG. 15 illustrates a data plane of an IP tunnel for a container-to-device downlink flow 1500 according to at least one embodiment. The following operations can be processed for the container-to-device downlink flow 1500: The cloud-based app 1502 sends a packet 1504 to a cloud server "1.1.1.1" using normal TCP socket API. Since "eth0" is the default interface for Internet access, the kernel mode TCP/IP stack 1506 generates an IP packet 1508 with eth0's IP address (10.0.0.2) as the source address and 1.1.1.1 as the destination address. The IP-tunnel agent 1510 in the container receives the raw Ethernet packet through the TUN/TAP interface. The IP-tunnel agent 1510 encapsulates the Ethernet packet into a UDP packet 1512 and forwards it to the cloud IP tunnel server 140 through the eth1 interface. The UDP packet 1512 has eth1's IP address (10.10.0.2) as the source address and the cloud IP tunnel server's IP address (10.10.01.1 as the destination IP). The cloud IP tunnel server 1514 receives the UDP packet 1512 and forwards the UDP payload to the streaming device through the DTLS connection. Now after going out AWS NAT router and over the Internet 1518, the IP tunnel payload is encrypted with DTLS and uses the app server's public IP address (X.X.X.X) as the source address and streaming device's public IP address (Y.Y.Y.Y) as the destination address. The home AP router 1520 conducts NAT over the DTLS packet and forwards it to the streaming device. Now, the DTLS packet 1522 has the streaming device's local network interface's IP address (e.g., 192.168.1.1) as the destination address. The IP-tunnel agent of the streaming device receives the packet through the DTLS connection. The IP-tunnel agent decrypts the packet to recover the original raw Ethernet payload 1522, and then writes it into the tun0 TUN/TAP interface. After NAT or bridging, the raw packet is transmitted over the wlan0 interface with 10.0.0.1 (NAT mode) or 10.0.0.2 (bridging mode) as the source IP address and 1.1.1.1 as the destination IP address. The Home AP router 1520 will forward it to a cloud server 1.1.1.1 of a third-party streaming service using home network's public IP address (Y.Y.Y.Y).

Figure 16:
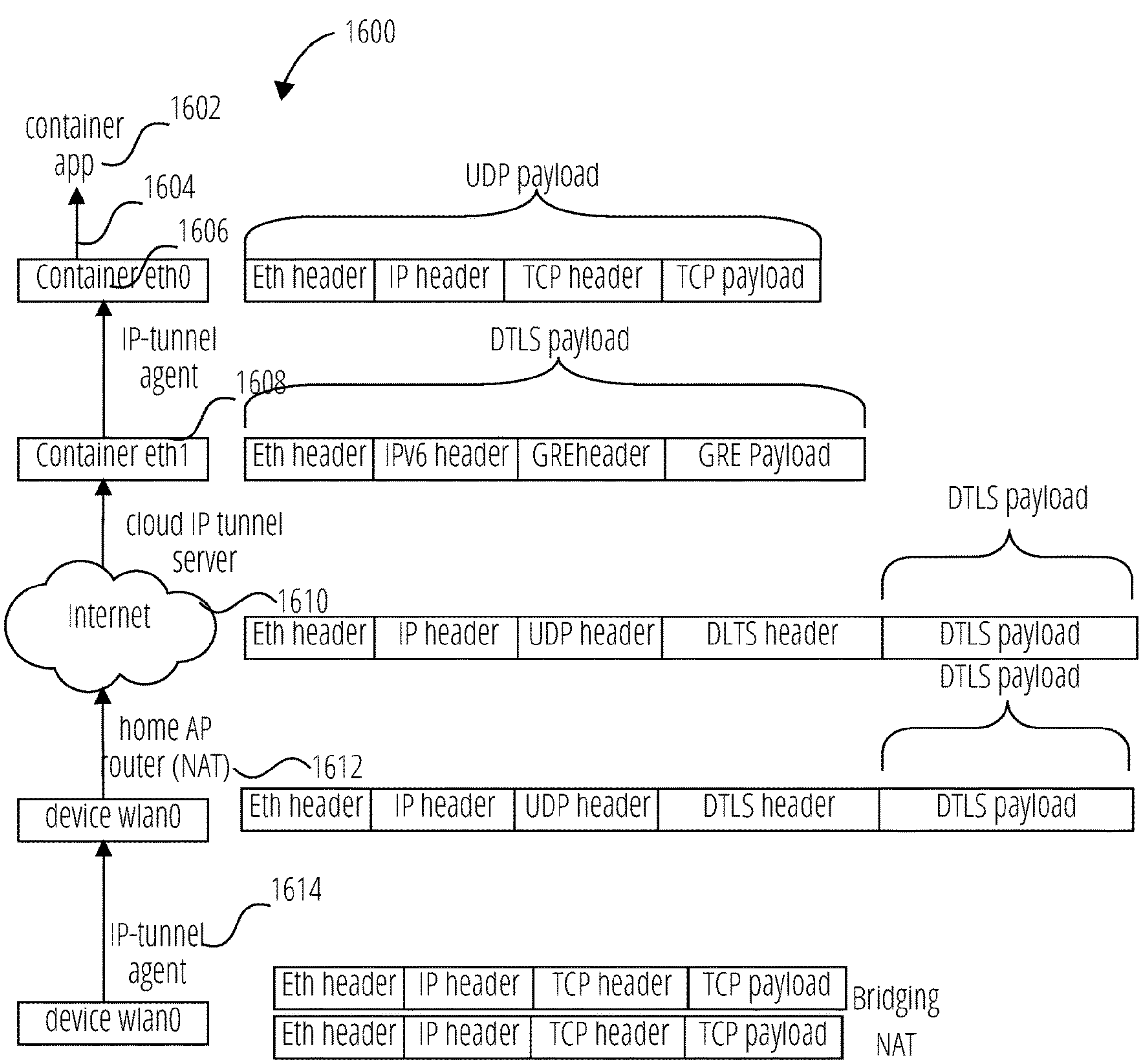
FIG. 16 illustrates a data plane of an IP tunnel for a device-to-container uplink flow according to at least one embodiment.

FIG. 16 illustrates a data plane of an IP tunnel for a device-to-container uplink flow 1600 according to at least one embodiment. The device-to-container uplink flow 1600 in FIG. 16 is the uplink packet flow (from 1.1.1.1 to 10.0.0.2), which follows similar operations with a reversed process order from the container-to-device downlink flow 1500 of FIG. 15.

The network traffic of cloud app containers can have three categories: 1) HTTP/HTTPS for streaming; 2) Non-HTTP/HTTPS packets; and 3) Non-streaming HTTP/HTTPS packets. The downlink and uplink broadcast or multicast packets can be transmitted with the same process through the IP tunnel. The packets of a second category (i.e., non-HTTP/HTTPS) can go through the above native tunneling process to be delivered through an IP tunnel. For the packets of a third category (i.e., non-streaming HTTP/HTTPS), the packets need to be forwarded back to container's IP tunnel agent by a video gateway before being sent to the IP tunnel. An example of this third category of packets is illustrated and described below with respect to FIG. 17.

Figure 17:
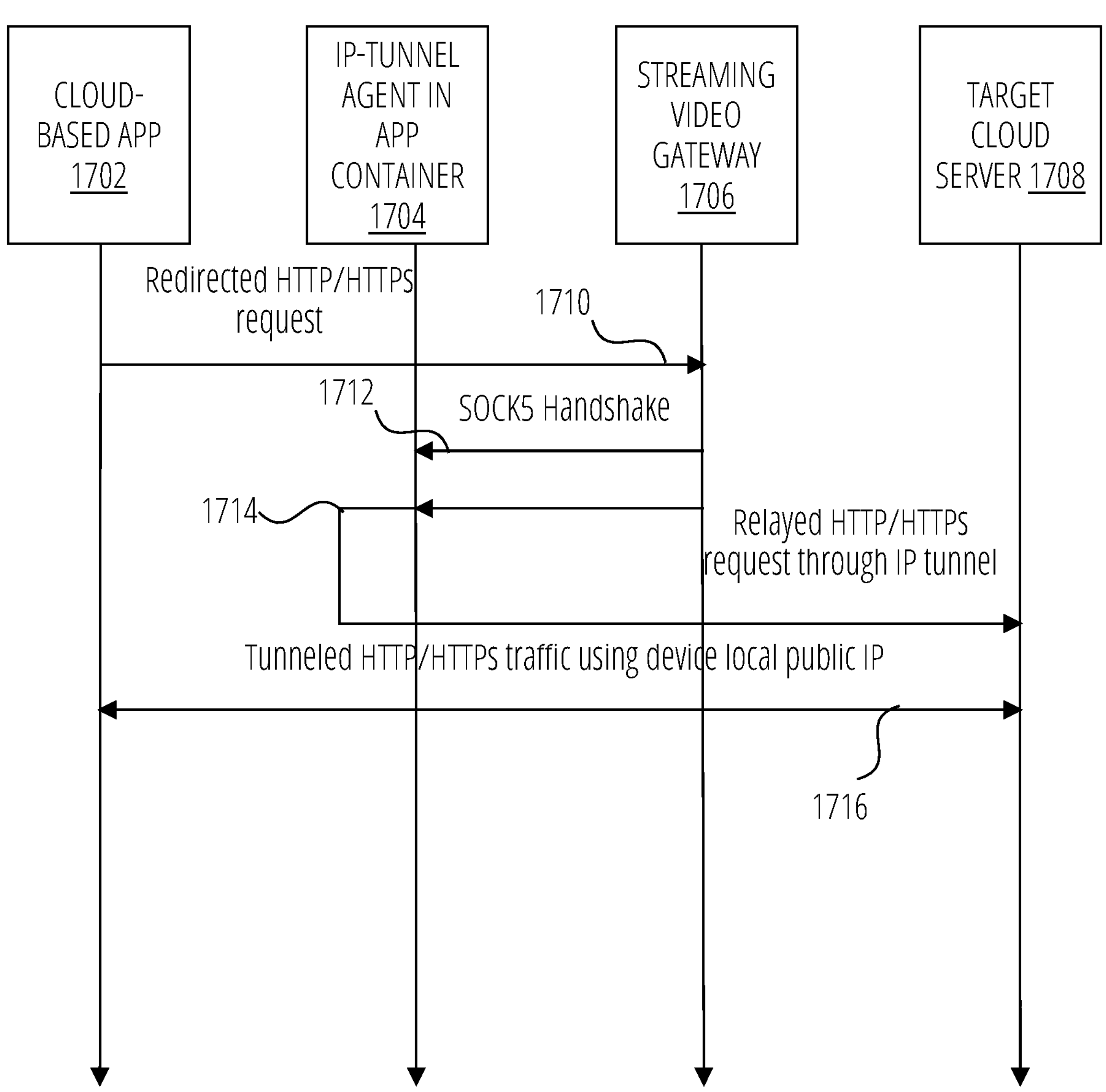
FIG. 17 illustrates a packet flow of a third category of packets according to at least one embodiment.

FIG. 17 illustrates a packet flow of a third category of packets according to at least one embodiment. A cloud-based app 1702 can send an HTTP/HTTPS request 1710 that is redirected to a streaming video gateway 1706. The streaming video gateway 1706 can decode the request 1710 and detect whether it is for video streaming. Instead of directly relaying the request to the target cloud server 1708 (i.e., the third-party streaming service), the streaming video gateway 1706 uses a socket proxy (e.g., SOCK5 socket proxy) provided by the IP-tunnel agent in app container 1704 for the relaying. The IP-tunnel agent in app container 1704 accepts a handshake 1712 (SOCKS5 handshake) from the streaming video gateway 1706 through the eth1 interface. Then the IP-tunnel agent in app container 1704 establishes a TCP connection 1714 with the target cloud server 1708 through the IP tunnel to start forwarding the packets of an HTTP/HTTPS connection 1716. Through transparent HTTP/HTTPS proxy in streaming video gateway 1706 and SOCK5 socket proxy in IP-tunnel agent in app container 1704, the cloud-based app 1702 establishes the HTTP/HTTPS connection 1716 with the target cloud server 1708 over the IP tunnel using streaming device's local public IP address.

IP Tunnel Agent in Streaming Device

Figure 18:
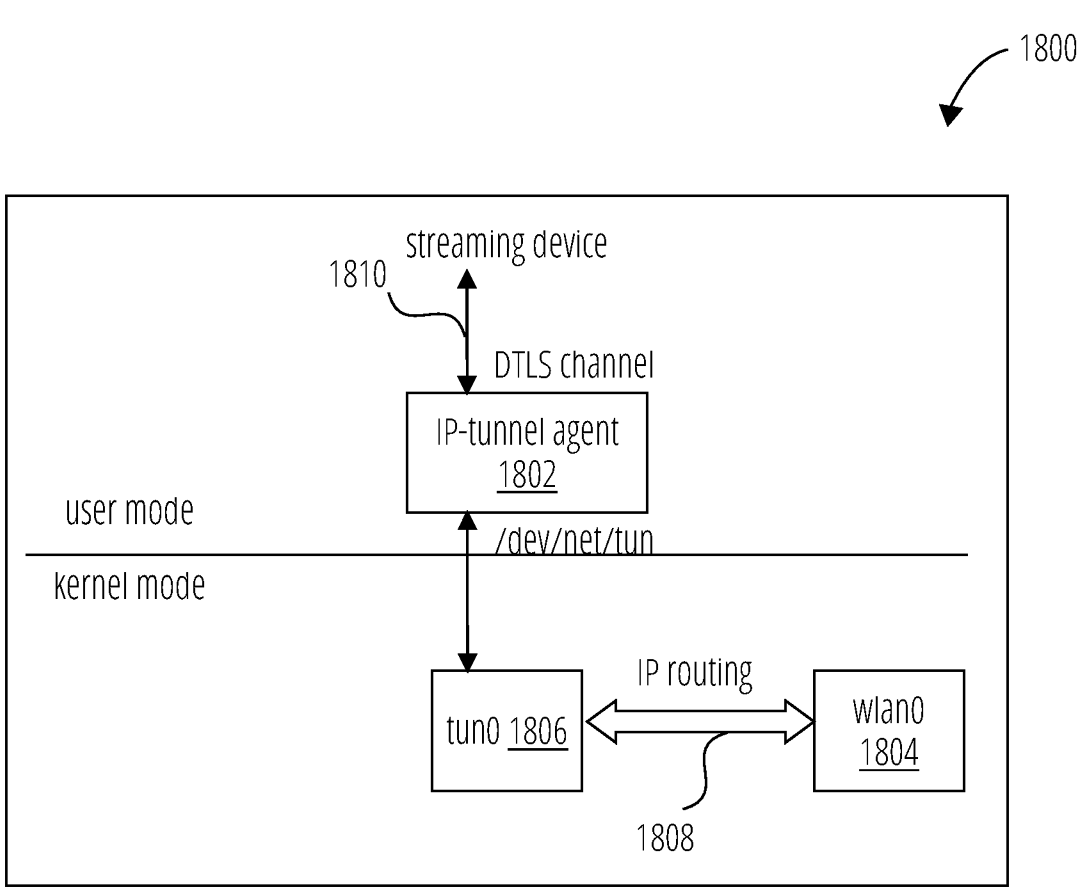
FIG. 18 illustrates components of an IP-tunnel agent in a streaming device according to at least one embodiment.

FIG. 18 illustrates components of an IP-tunnel agent 1802 in a streaming device 1800 according to at least one embodiment. The IP-tunnel agent 1802 implements a management plane to work with a cloud streaming server to create an IP tunnel based on DTLS. The IP-tunnel agent 1802 opens two file descriptors: the descriptor of/dev/net/tun for "tun0" in layer-2 TAP mode and the socket descriptor of DTLS connection (DTLS channel 1810) with cloud IP tunnel server. Then the IP-tunnel agent 1802 conducts packet forwarding between the descriptors. The forwarding policy is quite straightforward, any packets received from the tun0 interface will be sent to the DTLS tunnel. Any packets received from the DTLS tunnel will be sent to the tun0 interface.

In at least one embodiment, the IP-tunnel agent 1802 also calls the streaming device's NetworkManager to set up the kernel mode routing rules 1808 between tun0 and a local interface 1804 (e.g., wlan0 or eth0 if physical ethernet is in use). There are two routing modes: NAT mode or virtual bridging mode with BridgeD (BridgeD uses L3 policy routing to simulate L2 bridging). The IP-tunnel agent 1802 can enable bridging mode by using a DHCP request to obtain a local IPv4 address from the home AP router. If the local IP address is available, the IP-tunnel agent 1802 can send an ARP ping to a default gateway using this new IP address. If an ARP response is received, the home network is verified to be able to support the virtual bridging over the streaming device's WLAN interface, and then the bridging mode will be used, and the obtained IP address can be assigned to the cloud container through cloud streaming technology's DTLS channel 1810. If either DHCP or ARP ping fails, the home network doesn't support bridging mode, and the IP-tunnel agent 1802 returns to enable NAT mode. In NAT mode, a virtual internal IPv4 address is selected by the IP-tunnel agent 1802 and passed to cloud streaming server. Some WLAN networks, like Captive portal or Guest network, enforce client isolation to disable device-to-device communication, and therefore, the LAN access is disallowed. On such networks, the cloud-based app can still use streaming device's local IP addressing for Internet access through NAT mode.

In some embodiments, if multiple simultaneous cloud-based apps are required, the IP-tunnel agent 1802 can create multiple IP addresses (either using DHCP in bridging mode or virtual addresses in NAT mode) for those apps since the streaming manager launches a new container instance for each cloud-based app. Those cloud-based apps/containers can share the same DTLS connection for IP tunneling.

In some embodiments, since in bridging mode, multicast ICMPv6 packets like router solicitation (RS), router advertisement (RA), neighbor solicitation (NS) and neighbor advertisement (NA) will be forwarded over the IP tunnel, app containers can obtain IPv6 addresses from home network AP router using IPv6 SLAAC (Stateless Address Autoconfiguration). As such, IPv6 based apps like Matter can be supported through the IP tunnel.

In at least one embodiment, to avoid forwarding unnecessary multicast packets from the local home network to cloud containers in bridging mode, the streaming device's IP-tunnel agent should conduct multicast IGMP/MLD snooping to learn which multicast group traffic that the cloud containers are receiving. Then only the relevant multicast packets on LAN will be forwarded to cloud containers.

Cloud IP Tunnel Server

Figure 19:
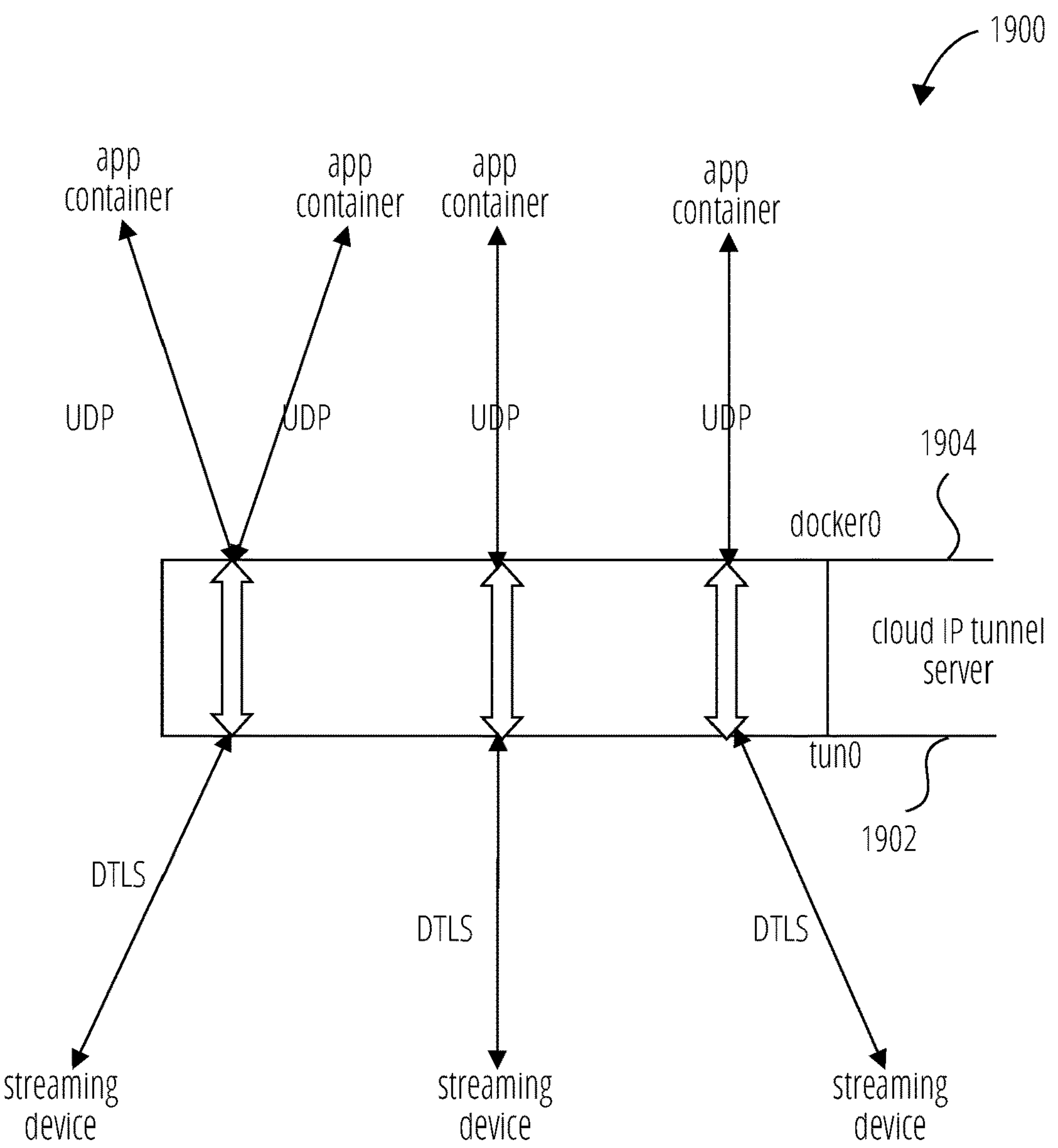
FIG. 19 illustrates packet forwarding managed by a cloud IP tunnel server according to at least one embodiment.

FIG. 19 illustrates packet forwarding managed by a cloud IP tunnel server 1900 according to at least one embodiment. The cloud IP tunnel server 1900 running in a host (e.g., EC2 instance) manages the DTLS connections with the streaming devices over the Internet and the UDP channels with the cloud container apps with the VPC. The cloud IP tunnel server 1900 conducts packet forwarding among the DTLS and UPD sockets. When a cloud container app is launched, its IP-tunnel agent sends a UDP request through the container's "eth1" interface to the cloud IP tunnel server 1900. The request includes the container's device identifier and MAC address of the tunnel interface (eth0). Then the cloud IP tunnel server 1900 creates a new UDP socket that only communicates with this container by binding to the container's "eth1" IP address.

For each DTLS connection with a streaming device, the cloud IP tunnel server 1900 maintains a device_ID-to-DTLS socket lookup table. That means using the device ID as the key, the cloud IP tunnel server 1900 can retrieve the corresponding DTLS socket. For each UDP channel with the cloud app container, the cloud IP tunnel server 1900 maintains a device_ID-to-UDP socket lookup table and a MAC_address-to-UDP socket lookup table. Through the device_ID-to-UDP table, the cloud IP tunnel server 1900 can retrieve all UDP channel sockets belonging to the same streaming device. Through the MAC_address-to-UDP table, the cloud IP tunnel server 1900 can retrieve the UDP socket connected to the container with the specified MAC address over the tunnel eth0 interface.

With the three tables described above, the cloud IP tunnel server 1900 can conduct the packet forwarding for unicast downstream (container to streaming device), unicast upstream (streaming device to container), and broadcast/multicast (downstream or upstream traffic). For each unicast downstream packet, the cloud IP tunnel server 1900 can use the device ID of ingress UDP socket to look up in the device_ID-to-DTLS table to get the target DTLS socket and then forward the packet to the DTLS connection. For each unicast upstream packet, the cloud IP tunnel server 1900 can use the packet's destination MAC address and the ingress DTLS connection's device ID to look up the MAC_address-to-UDP table to get the target UDP socket, and then forward the packets to the UDP channel. For each broadcast/multicast packet, the cloud IP tunnel server 1900 can look up the device_ID-to-DTLS and device_ID-to-UDP tables to get the DTLS and UDP sockets belonging to the same device ID of ingress socket, then duplicate and send the packet for all the sockets except the ingress socket.

IP-Tunnel Agent in App Container

FIG. 20 illustrates components of an IP-tunnel agent 2004 in an app container 2010 of an app server 2000 according to at least one embodiment. After the app container 2010 is launched, the IP-tunnel agent 2004 in the app container 2010 creates a virtual tunnel interface "eth0" through the descriptor device file "/dev/net/tun." The "eth0" interface is configured with the IP address assigned by the IP-tunnel agent of the streaming device. Then IP-tunnel agent 2004 can establish a UDP channel with cloud IP tunnel server 2012 through the pre-configured "eth1" interface. After that, the IP-tunnel agent 2004 can conduct the simple packet forwarding between the "/dev/net/tun" tunnel interface and UDP channel: the packets received from/dev/net/tun will be sent to UDP channel, and the packets received from UDP channel will be sent to/dev/net/tun. To allow the IP-tunnel agent 2004 to manage the network interface for tunneling, the NET_ADMIN and NET_RAW Linux capabilities can be assigned to the Docker instance.

The IP-tunnel agent 2004 in the app container 2010 also runs as a SOCKS5 socket proxy server for the streaming video gateway 2002. When the streaming video gateway 2002 intercepts an HTTP/HTTPS connection from the streaming application (app container 2010) and identifies the request is not for streaming, the streaming video gateway 2002 initiates a SOCKS5 handshake with the container's IP tunnel agent to relay the HTTP/HTTPS connection through the IP tunnel as described herein. Then, the non-streaming HTTP/HTTPS connection can use the streaming device's local public IP address to reach out to the target cloud server (e.g., third-party cloud servers).

Figure 21:
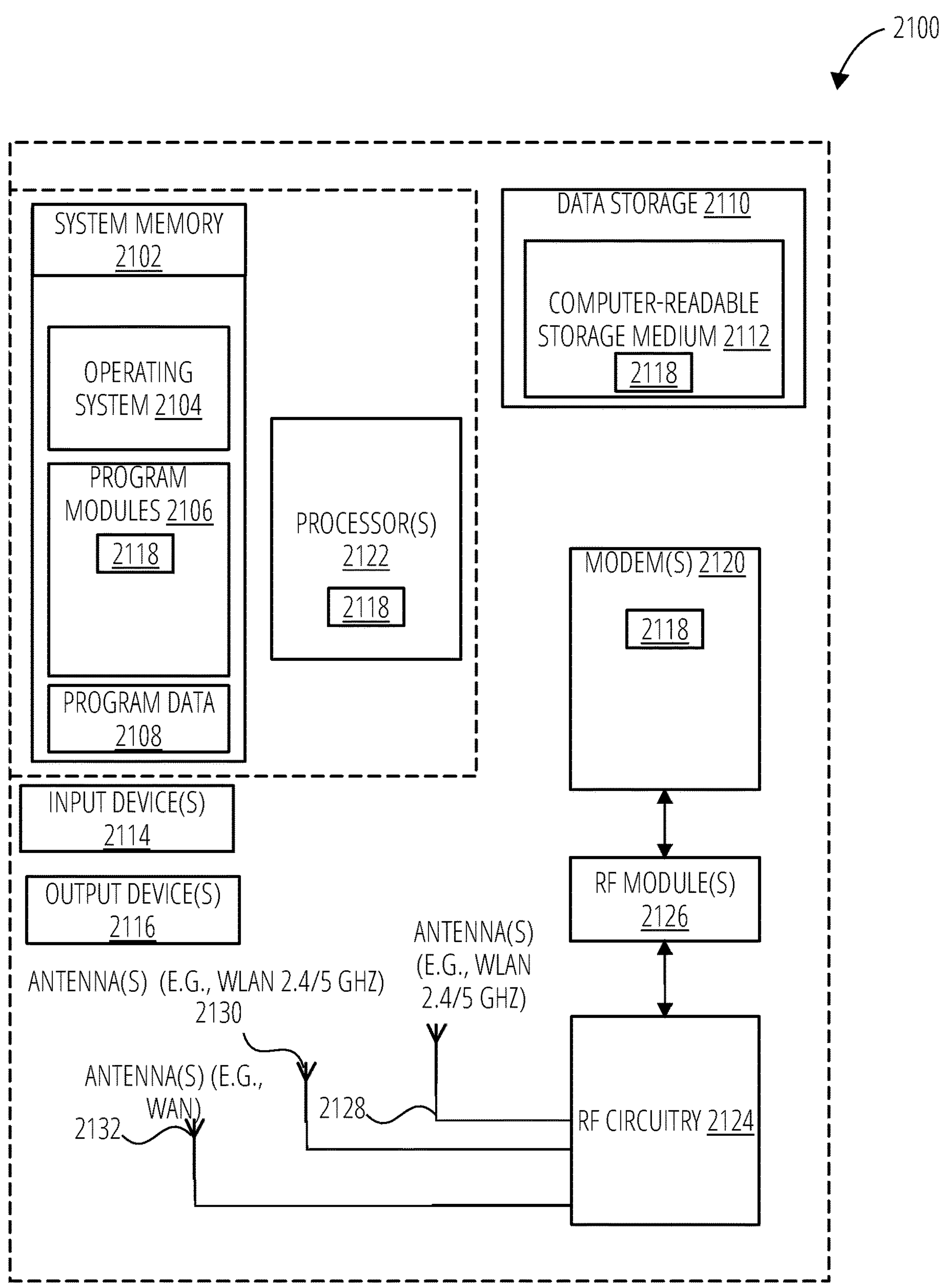
FIG. 21 is a block diagram of a wireless device for establishing IP tunnels between the wireless device and an app container executing a streaming application on a remote computing device according to one embodiment.

FIG. 21 is a block diagram of a wireless device 2100 for establishing IP tunnels between the wireless device and an app container executing a streaming application on a remote computing device according to one embodiment. The wireless device 2100 may correspond to the mesh network devices described above with respect to FIG. 22 to FIG. 6. Alternatively, the wireless device 2100 may be other electronic devices, as described herein.

The wireless device 2100 includes one or more processor(s) 2122, such as one or more CPUs, microcontrollers, field-programmable gate arrays, or other types of processors. The wireless device 2100 also includes system memory 2102, which may correspond to any combination of volatile and/or non-volatile storage mechanisms. The system memory 2102 stores information that provides operating system component 2104, various program modules 2106, program data 2108, and/or other components. In one embodiment, the system memory 2102 stores instructions of methods to control the operation of the wireless device 2100. The wireless device 2100 performs functions using the processor(s) 2122 to execute instructions provided by the system memory 2102. In one embodiment, the program modules 2106 may include the processing logic 2118 described herein. The processing logic 2118 may perform some operations for establishing IP tunnels between the wireless device and an app container executing a streaming application on a remote computing device as described herein.

The wireless device 2100 also includes a data storage device 2110 that may be composed of one or more types of removable storage and/or one or more types of non-removable storage. The data storage device 2112 includes a computer-readable storage medium 2112 on which is stored one or more sets of instructions embodying any of the methodologies or functions described herein. Instructions for the program modules 2106 (e.g., processing logic 2118) may reside, completely or at least partially, within the computer-readable storage medium 2112, system memory 2102, and/or within the processor(s) 2122 during execution thereof by the wireless device 2100, the system memory 2102 and the processor(s) 2122 also constituting computer-readable media. The wireless device 2100 may also include one or more input device(s) 2114 (keyboard, mouse device, specialized selection keys, etc.) and one or more output device(s) 2116 (displays, printers, audio output mechanisms, etc.).

The wireless device 2100 further includes one or more modem(s) 2120 to allow the wireless device 2100 to communicate via wireless connections (e.g., such as provided by the wireless communication system) with other computing devices, such as remote computers, an item providing system, and so forth. The modem(s) 2120 can be connected to one or more radio frequency (RF) modules 2126. The RF modules 2126 may be a WLAN module, a WAN module, a wireless personal area network (WPAN) module, a Global Positioning System (GPS) module, or the like. The antenna structures (antenna(s) 2128, 2130, 2132) are coupled to the Rf circuitry 2124, which is coupled to the modem(s) 2120. The Rf circuitry 2124 may include radio front-end circuitry, antenna switching circuitry, impedance matching circuitry, or the like. The antenna(s) 2128, 2130, 2132 may be GPS antennas, near-field communication (NFC) antennas, other WAN antennas, WLAN or PAN antennas, or the like. The modem(s) 2120 allows the wireless device 2100 to handle both voice and non-voice communications (such as communications for text messages, multimedia messages, media downloads, web browsing, etc.) with a wireless communication system. The modem(s) 2120 may provide network connectivity using any type of mobile network technology including, for example, cellular digital packet data (CDPD), general packet radio service (GPRS), EDGE, universal mobile telecommunications system (UMTS), 1 time radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem(s) 2120 may generate signals and send these signals to the antenna(s) 2128 of a first type (e.g., WLAN 5 GHz), antenna(s) 2130 of a second type (e.g., WLAN 2.4 GHz), and/or antenna(s) 2132 of a third type (e.g., WAN), via Rf circuitry 2124, and Rf module(s) 2126 as described herein. Antenna(s) 2128, 2130, 2132 may be configured to transmit in different frequency bands and/or using different wireless communication protocols. The antenna(s) 2128, 2130, 2132 may be directional, omnidirectional, or non-directional antennas. In addition to sending data, antenna(s) 2128, 2130, 2132 may also receive data, which is sent to appropriate RF modules connected to the antennas. One of the antennas antenna(s) 2128, 2130, 2132 may be any combination of the antenna structures described herein.

In one embodiment, the wireless device 2100 establishes a first connection using a first wireless communication protocol and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of a wireless mesh network, and the second wireless connection may be associated with serving a content file to a client consumption device, as described herein.

In the above description, numerous details are set forth. It will be apparent to one of ordinary skill in the art having the benefit of this disclosure, however, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. Therefore, the scope of the present embodiments should be determined with reference to the appended claims, along with the full scope of equivalents to which such claims are entitled.

What is claimed is:

1. A streaming device comprising:

a memory device that stores instructions; and a processing device, operatively coupled to the memory device, that executes the instructions to perform operations comprising:

receiving user input comprising a selection of a streaming app;

registering the streaming device with a remote computing device hosting the streaming app;

creating a first virtual interface using a Virtual Private Network (VPN) protocol, wherein the first virtual interface is provisioned with an IPv6 address associated with the streaming device;

establishing a VPN tunnel between the first virtual interface and the streaming app, wherein the VPN tunnel is a layer-3 tunnel;

creating a second virtual interface using an Ethernet-over-IP protocol;

sending, to the remote computing device, a device identifier associated with the streaming device and an IPv4 address assigned to the streaming app, wherein the IPv4 address is associated with a local network, wherein the streaming device is part of the local network;

establishing an Ethernet-over-IP tunnel between the second virtual interface and the streaming app through the VPN tunnel, wherein the Ethernet-over-IP tunnel is a layer-2 tunnel;

and communicating data with the streaming app over the Ethernet-over-IP tunnel.

2. The streaming device of claim 1, wherein:

establishing the VPN tunnel comprises establishing the VPN tunnel with a VPN cloud server executed by the remote computing device;

establishing the Ethernet-over-IP tunnel comprises establishing the Ethernet-over-IP tunnel with an app container executed by the remote computing device; and registering the streaming device with the remote computing device comprises:

uploading a public key to the VPN cloud server through a secure channel between the streaming device and the remote computing device, wherein the secure channel is different from the VPN tunnel and the Ethernet-over-IP tunnel; and receiving configuration information from the VPN cloud server, the configuration information including the IPv6 address associated with the streaming device.

3. The streaming device of claim 1, wherein the operations further comprise:

obtaining the IPv4 address from a Dynamic Host Configuration Protocol (DHCP) server that is part of the local network;

sending the IPv4 address over a secure channel to a streaming manager executed by the remote computing device, wherein the secure channel is different from the VPN tunnel and the Ethernet-over-IP tunnel;

receiving a request from the streaming app through the VPN tunnel, wherein acceptance of the request establishes the Ethernet-over-IP tunnel between the second virtual interface and the streaming app through the VPN tunnel; and providing through the Ethernet-over-IP tunnel at least one of local area network (LAN) access or Internet access to the streaming app.

4. A method of operating a device, the method comprising:

receiving, by the device, a request to execute a streaming application, wherein the streaming application is hosted on a remote computing device;

creating, by the device, a first virtual interface, wherein the first virtual interface is assigned an IPv6 address associated with a container executing the streaming application on the remote computing device;

establishing, by the device, a first Internet Protocol (IP) tunnel with the remote computing device, wherein the first IP tunnel is a layer-3 tunnel;

creating, by the device, a second virtual interface;

sending, by the device to the remote computing device, a device identifier associated with the device and an IPv4 address associated with the streaming application;

establishing, by the device, a second IP tunnel with the container, wherein the second IP tunnel is a layer-2 Ethernet-over-IP tunnel;

and communicating data with the streaming application over the second IP tunnel.

5. The method of claim 4, further comprising:

receiving user input comprising a selection of the streaming application;

registering the device with a Virtual Private Network (VPN) cloud server executed by the remote computing device; and receiving configuration information from the VPN cloud server, the configuration information including the IPv6 address.

6. The method of claim 5, further comprising:

generating a key pair comprising a private key and a public key for the first IP tunnel; and sending the public key to the VPN cloud server through a secure channel between the device and the remote computing device.

7. The method of claim 4, further comprising:

establishing the first IP tunnel comprises creating the first virtual interface using a Virtual Private Network (VPN) protocol; and establishing the second IP tunnel comprises creating the second virtual interface using a using an Ethernet-over-IP protocol.

8. The method of claim 4, further comprising establishing at least one of a bridge mode or network address translation (NAT) mode between the second virtual interface and a local network interface, wherein the local network interface is at least one of a local area network (LAN) interface or a wireless LAN (WLAN) interface.

9. The method of claim 4, further comprising:

obtaining the IPv4 address from a Dynamic Host Configuration Protocol (DHCP) server that is part of a local network; and sending the IPv4 address over a secure channel to a streaming manager executed by the remote computing device, wherein the streaming manager launches the container with the IPv4 address and the IPv6 address.

10. The method of claim 4, further comprising:

receiving a request from the streaming application through the first IP tunnel;

establishing, after receiving the request, the second IP tunnel between the second virtual interface and the streaming application through the first IP tunnel; and providing through the second IP tunnel at least one of local area network (LAN) access or Internet access to the streaming application using the IPv4 address.

11. The method of claim 4, further comprising:

performing, in a kernel mode, packet forwarding between the first virtual interface, the second virtual interface, and a local network interface;

receiving, in a user mode, configuration information from a Virtual Private Network (VPN) cloud server executed by the remote computing device, the configuration information including the IPv6 address associated with the first virtual interface; and sending, in the user mode, a public key to the VPN cloud server through a secure channel between the device and the remote computing device.

12. The method of claim 4, wherein communicating the data with the streaming application over the second IP tunnel comprises:

receiving a data packet from an access point (AP) router that is part of a local network, the data packet comprising a destination address associated with a local network interface;

decrypting the data packet to obtain an Ethernet IPv6 payload;

routing the Ethernet IPv6 payload to the second virtual interface;

obtaining an Ethernet packet generated by the streaming application; and transmitting, to the AP router, the Ethernet packet over the local network interface with a source address that specifies the IPv4 address and a destination address that specifies a third-party streaming service, the AP router forwarding the Ethernet packet to the third-party streaming service using a public IP address associated with the local network.

13. The method of claim 4, wherein communicating the data with the streaming application over the second IP tunnel comprises:

receiving, from an access point (AP) router that is part of a local network, an Ethernet packet over a local network interface with a source address that specifies a third-party streaming service and a destination address that specifies the IPv4 address, wherein the AP router receives the Ethernet packet from the third-party streaming service using a public IP address associated with the local network;

routing the Ethernet packet to the second virtual interface;

adding an IPv6 header to the Ethernet packet to obtain an Ethernet IPv6 payload;

encrypting the Ethernet IPv6 payload and adding an IPv4 header and a VPN protocol header to obtain a data packet; and sending the data packet to the AP router, the data packet comprising a destination address that specifies a public IP address associated with the remote computing device.

14. The method of claim 4, wherein the data comprises at least one packet comprising:

a first Ethernet header;

a first IP header comprising a source address that specifies a public IP address associated with the remote computing device and a destination address that specifies an IP address associated with a local network interface;

a User Datagram Protocol (UDP) header;

a first header associated with the first IP tunnel;

an IPv6 header comprising a source address that specifies an IPv6 address associated with a local network interface of the remote computing device and a destination address that specifies the IPv6 address assigned to the first virtual interface;

a second header associated with the second IP tunnel;

a second Ethernet header;

a second IP header comprising a source address that specifies the IPv4 address assigned to the streaming application and a destination address that specifies a public IP address associated with a third-party streaming service;

a Transmission Control Protocol (TCP) header; and a TCP payload.

15. The method of claim 4, wherein the data comprises at least one packet comprising:

a first Ethernet header;

a first IP header comprising a source address that specifies an IP address associated with a local network interface and a destination address that specifies a public IP address associated with the remote computing device;

a User Datagram Protocol (UDP) header;

a first header associated with the first IP tunnel;

an IPv6 header comprising a source address that specifies the IPv6 address assigned to the first virtual interface and a destination address that specifies an IPv6 address associated with a local network interface of the remote computing device;

a second header associated with the second IP tunnel;

a second Ethernet header;

a second IP header comprising a source address that specifies a public IP address associated with a third-party streaming service and a destination address that specifies the IPv4 address assigned to the streaming application;

a Transmission Control Protocol (TCP) header; and a TCP payload.

16. A device comprising:

a memory device that stores instructions; and a processing device, operatively coupled to the memory device, that executes the instructions to perform operations comprising:

receiving a request to execute a streaming application, wherein the streaming application is hosted on a remote computing device;

creating a first virtual interface, wherein the first virtual interface is assigned an IPv6 address associated with a container executing the streaming application on the remote computing device;

establishing a first Internet Protocol (IP) tunnel with the remote computing device, wherein the first IP tunnel is a layer-3 tunnel;

creating a second virtual interface;

sending, to the remote computing device, a device identifier associated with the device and an IPv4 address associated with the streaming application;

establishing a second IP tunnel with the container, wherein the second IP tunnel is a layer-2 Ethernet-over-IP tunnel; and communicating data with the streaming application over the second IP tunnel.

17. The device of claim 16, wherein the operations further comprise:

receiving user input comprising a selection of the streaming application;

registering the device with a Virtual Private Network (VPN) cloud server executed by the remote computing device; and receiving configuration information from the VPN cloud server, the configuration information including the IPv6 address.

18. The device of claim 17, wherein the operations further comprise:

generating a key pair comprising a private key and a public key for the first IP tunnel; and sending the public key to the VPN cloud server through a secure channel between the device and the remote computing device.

19. The device of claim 16, wherein the data comprises at least one packet comprising:

a first Ethernet header;

a first IP header comprising a source address that specifies a public IP address associated with the remote computing device and a destination address that specifies an IP address associated with a local network interface;

a User Datagram Protocol (UDP) header;

a first header associated with the first IP tunnel;

an IPv6 header comprising a source address that specifies an IPv6 address associated with a local network interface of the remote computing device and a destination address that specifies the IPv6 address assigned to the first virtual interface;

a second header associated with the second IP tunnel;

a second Ethernet header;

a second IP header comprising a source address that specifies the IPv4 address assigned to the streaming application and a destination address that specifies a public IP address associated with a third-party streaming service;

a Transmission Control Protocol (TCP) header; and a TCP payload.

20. The device of claim 16, wherein the data comprises at least one packet comprising:

a first Ethernet header;

a first IP header comprising a source address that specifies an IP address associated with a local network interface and a destination address that specifies a public IP address associated with the remote computing device;

a User Datagram Protocol (UDP) header;

a first header associated with the first IP tunnel;

an IPv6 header comprising a source address that specifies the IPv6 address assigned to the first virtual interface and a destination address that specifies an IPv6 address associated with a local network interface of the remote computing device;

a second header associated with the second IP tunnel;

a second Ethernet header;

a second IP header comprising a source address that specifies a public IP address associated with a third-party streaming service and a destination address that specifies the IPv4 address assigned to the streaming application;

a Transmission Control Protocol (TCP) header; and a TCP payload.

* * * * *